US012250641B2

United States Patent
Abdel Shahid et al.

(10) Patent No.: US 12,250,641 B2
(45) Date of Patent: *Mar. 11, 2025

(54) DYNAMIC SWITCHING OF USER EQUIPMENT POWER CLASS

(71) Applicant: T-Mobile USA, Inc., Bellevue, WA (US)

(72) Inventors: Wafik Abdel Shahid, Kenmore, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,050

(22) Filed: Jan. 29, 2024

(65) Prior Publication Data

US 2024/0172127 A1 May 23, 2024

Related U.S. Application Data

(63) Continuation of application No. 18/083,724, filed on Dec. 19, 2022, now Pat. No. 11,889,430, which is a continuation of application No. 17/204,754, filed on Mar. 17, 2021, now Pat. No. 11,533,688.

(51) Int. Cl.
*H04W 52/24* (2009.01)

(52) U.S. Cl.
CPC .................. *H04W 52/24* (2013.01)

(58) Field of Classification Search
CPC .................................. H04W 52/24
See application file for complete search history.

(56) References Cited

U.S. PATENT DOCUMENTS 4,636,741 A * 1/1987 Mitzlaff ............... H03F 1/0233
                                                        455/99
5,652,893 A * 7/1997 Ben-Meir ............ H04L 41/26
                                                        713/300

(Continued)

FOREIGN PATENT DOCUMENTS

| EP | 2086125 | 3/2016 |
| EP | 2086125 B1 * | 3/2017 | ............ H03G 3/3047 |
| WO | WO201915846 A | 8/2019 |

OTHER PUBLICATIONS

Extended European Search Report mailed Jul. 11, 2022 for European Patent Application No. 22159830.3, 10 pages.

(Continued)

*Primary Examiner* — Hai V Nguyen
(74) *Attorney, Agent, or Firm* — Lee & Hayes, P.C.

(57) ABSTRACT

A user equipment (UE), such as a mobile phone, may support multiple power classes. Power classes can define maximum output power levels for uplink transmissions. A base station of a radio access network (RAN) can, based on metrics reported by the UE, dynamically instruct the UE to switch to using a different power class. For example, the base station may instruct the UE to switch from using a first power class with a higher maximum output power to using a second power class with a lower maximum output power, in order to preserve battery life of the UE in situations in which the second power class provides sufficient output power for uplink transmissions to reach the base station.

20 Claims, 7 Drawing Sheets

(56) References Cited

U.S. PATENT DOCUMENTS

| | | | | |
|---|---|---|---|---|
| 5,999,832 A * | 12/1999 | Vannatta | H04W 52/10 | 455/575.1 |
| 6,748,245 B1 * | 6/2004 | Thierry | H04W 52/36 | 455/574 |
| 8,315,661 B2 * | 11/2012 | Zong | H04W 52/367 | 455/226.1 |
| 8,600,424 B2 * | 12/2013 | Chen | H04W 52/325 | 713/320 |
| 8,768,397 B2 * | 7/2014 | Imamura | H04W 52/367 | 455/500 |
| 8,818,285 B2 * | 8/2014 | Borran | H04W 72/51 | 455/63.1 |
| 8,843,069 B2 * | 9/2014 | Borran | H04W 52/243 | 455/503 |
| 8,873,439 B2 * | 10/2014 | Ji | H04W 72/0446 | 455/73 |
| 8,917,656 B2 * | 12/2014 | Goransson | H04L 1/0001 | 370/328 |
| 8,934,362 B2 * | 1/2015 | Hsu | H04W 52/34 | 370/254 |
| 8,971,299 B2 * | 3/2015 | Papasakellariou | H04W 52/146 | 370/338 |
| 9,031,601 B2 * | 5/2015 | Coe | H04W 52/241 | 455/522 |
| 9,049,667 B2 | 6/2015 | Imamura et al. | | |
| 9,078,220 B2 | 7/2015 | Makhlouf et al. | | |
| 9,107,175 B2 * | 8/2015 | Kim | H04W 72/21 | |
| 9,113,422 B2 * | 8/2015 | Jeong | H04W 52/146 | |
| 9,146,814 B1 * | 9/2015 | van der Merwe | G06F 11/3058 | |
| 9,173,109 B2 * | 10/2015 | Xu | H04L 5/0053 | |
| 9,198,141 B2 * | 11/2015 | Papasakellariou | H04W 52/18 | |
| 9,215,665 B2 * | 12/2015 | Papasakellariou | H04L 1/1812 | |
| 9,220,072 B2 * | 12/2015 | Hsu | H04W 52/367 | |
| 9,398,480 B2 * | 7/2016 | Siomina | H04L 1/0026 | |
| 9,414,323 B2 * | 8/2016 | Papasakellariou | H04W 52/367 | |
| 9,420,476 B2 * | 8/2016 | Koutsimanis | H04J 11/005 | |
| 9,425,839 B2 * | 8/2016 | Kazmi | H04W 52/244 | |
| 9,439,156 B2 * | 9/2016 | Jeong | H04W 52/288 | |
| 9,468,018 B2 * | 10/2016 | Kim | H04W 52/146 | |
| 9,538,410 B2 * | 1/2017 | Park | H04L 5/0048 | |
| 9,543,787 B2 * | 1/2017 | Duchesneau | H02J 9/00 | |
| 9,596,043 B2 * | 3/2017 | Yang | H04W 24/08 | |
| 9,723,571 B2 * | 8/2017 | Jeong | H04L 5/0066 | |
| 9,735,946 B2 * | 8/2017 | Ji | H04L 5/0058 | |
| 9,877,337 B2 * | 1/2018 | Seo | H04W 72/121 | |
| 9,979,530 B2 * | 5/2018 | Elshaer | H04L 5/001 | |
| 9,985,669 B2 * | 5/2018 | Kazmi | H04J 11/005 | |
| 10,103,832 B2 * | 10/2018 | Koutsimanis | H04W 24/02 | |
| 10,251,136 B2 * | 4/2019 | Kanno | H04W 52/367 | |
| 10,262,788 B2 * | 4/2019 | Bailey | A61B 5/055 | |
| 10,264,437 B2 * | 4/2019 | Poitau | H04W 76/14 | |
| 10,264,534 B1 | 4/2019 | Park | | |
| RE47,463 E * | 6/2019 | Liu | H04L 5/0048 | |
| 10,367,677 B2 * | 7/2019 | Parkvall | H04J 11/0059 | |
| 10,412,691 B1 * | 9/2019 | Marupaduga | H04W 52/365 | |
| 10,455,587 B2 * | 10/2019 | Seo | H04W 72/56 | |
| 10,470,073 B1 * | 11/2019 | Marupaduga | H04L 1/0001 | |
| 10,582,454 B2 * | 3/2020 | Babaei | H04W 72/0473 | |
| 10,602,478 B1 * | 3/2020 | Marupaduga | H04W 64/006 | |
| 10,623,070 B1 * | 4/2020 | Marupaduga | H04B 7/0628 | |
| 10,708,920 B2 * | 7/2020 | Kitazoe | H04W 72/51 | |
| 10,716,124 B1 * | 7/2020 | Marupaduga | H04B 7/0695 | |
| 10,727,967 B2 * | 7/2020 | Gao | H04J 13/0003 | |
| 10,735,173 B2 * | 8/2020 | Anaya Chamorro | H04W 72/543 | |
| 10,779,198 B1 | 9/2020 | Oroskar et al. | | |
| 10,790,885 B1 * | 9/2020 | Raghunathan | H04L 1/0015 | |
| 10,819,402 B1 * | 10/2020 | Marupaduga | H04B 7/0452 | |
| 10,826,576 B1 * | 11/2020 | Marupaduga | H04W 24/08 | |
| 10,862,553 B1 * | 12/2020 | Kim | H04L 1/0003 | |
| 10,880,719 B2 * | 12/2020 | Poitau | H04W 76/14 | |
| 10,891,342 B2 * | 1/2021 | Carter | H04L 67/52 | |
| 10,892,929 B2 * | 1/2021 | Sorrentino | H04B 7/0891 | |
| 10,907,616 B2 * | 2/2021 | Kreutzfeldt | F03D 17/0065 | |
| 10,912,042 B2 * | 2/2021 | Zeng | H04W 52/0209 | |
| 10,952,089 B2 * | 3/2021 | Shoji | H04B 17/336 | |
| 10,958,317 B1 * | 3/2021 | Marupaduga | H04L 5/0053 | |
| 10,958,328 B2 * | 3/2021 | Chendamarai Kannan | H04B 7/0639 | |
| 10,962,623 B1 * | 3/2021 | Cromarty | G01R 17/20 | |
| 10,980,065 B2 * | 4/2021 | Van Phan | H04W 76/15 | |
| 10,980,359 B2 * | 4/2021 | Billings | G06Q 10/20 | |
| 10,986,622 B2 * | 4/2021 | Zhang | H04L 5/0094 | |
| 11,006,413 B2 * | 5/2021 | Wang | H04L 5/0098 | |
| 11,026,235 B2 * | 6/2021 | Raghavan | H04B 7/0408 | |
| 11,057,846 B2 * | 7/2021 | Yang | H04W 52/367 | |
| 11,071,066 B2 * | 7/2021 | Babaei | H04W 72/0473 | |
| 11,102,786 B2 * | 8/2021 | Salem | H04W 72/54 | |
| 11,102,835 B1 * | 8/2021 | Marupaduga | H04B 7/0452 | |
| 11,115,935 B1 * | 9/2021 | Saha | H04W 76/16 | |
| 11,129,103 B2 * | 9/2021 | Jain | H04L 1/0026 | |
| 11,132,991 B2 * | 9/2021 | Park | G06N 7/01 | |
| RE48,784 E * | 10/2021 | Papasakellariou | H04W 74/004 | |
| 11,139,909 B2 * | 10/2021 | Uesaka | H04W 4/06 | |
| 11,140,639 B1 * | 10/2021 | Marupaduga | H04B 7/0452 | |
| 11,140,695 B1 * | 10/2021 | Eyuboglu | H04W 72/535 | |
| 11,146,987 B1 * | 10/2021 | Marupaduga | H04B 7/0452 | |
| 11,147,024 B2 * | 10/2021 | Jeong | H04L 5/0066 | |
| 11,147,044 B2 * | 10/2021 | Lee | H04W 72/02 | |
| 11,166,229 B2 * | 11/2021 | Sundberg | H04W 8/245 | |
| 11,166,275 B2 * | 11/2021 | Lee | H04W 72/12 | |
| 11,184,848 B2 * | 11/2021 | Islam | H04B 7/0617 | |
| 11,189,921 B1 * | 11/2021 | Tran | H01Q 1/04 | |
| 11,284,321 B2 * | 3/2022 | Cui | H04W 36/0058 | |
| 11,329,790 B2 * | 5/2022 | Abdelghaffar | H04L 5/0092 | |
| 11,533,688 B2 * | 12/2022 | Abdel Shahid | H04W 52/267 | |
| 11,889,430 B2 * | 1/2024 | Abdel Shahid | H04W 52/267 | |
| 2001/0042152 A1 * | 11/2001 | Kobayashi | G06F 13/4045 | 710/305 |
| 2005/0124305 A1 * | 6/2005 | Stichelbout | H04W 52/283 | 455/117 |
| 2009/0175187 A1 * | 7/2009 | Jersenius | H04W 52/365 | 370/252 |
| 2009/0176525 A1 * | 7/2009 | Wang | H04W 74/0833 | 455/522 |
| 2009/0286566 A1 * | 11/2009 | Lindholm | H04W 52/242 | 455/522 |
| 2010/0246463 A1 * | 9/2010 | Papasakellariou | H04L 5/0092 | 370/311 |
| 2010/0323745 A1 * | 12/2010 | Chen | H04W 52/325 | 455/522 |
| 2011/0081934 A1 * | 4/2011 | Imamura | H04W 52/146 | 455/522 |
| 2011/0159912 A1 * | 6/2011 | Zong | H04W 52/367 | 455/67.11 |
| 2011/0182201 A1 * | 7/2011 | Pajukoski | H04W 52/22 | 370/252 |
| 2011/0222455 A1 * | 9/2011 | Hou | H04W 52/24 | 375/232 |
| 2011/0235601 A1 * | 9/2011 | Yoo | H04L 5/0053 | 370/329 |
| 2011/0239013 A1 * | 9/2011 | Muller | G06F 1/3275 | 713/320 |
| 2012/0009962 A1 * | 1/2012 | Liu | H04W 52/367 | 455/509 |
| 2012/0176923 A1 * | 7/2012 | Hsu | H04W 52/367 | 370/252 |
| 2012/0176979 A1 * | 7/2012 | Kim | H04W 72/21 | 370/329 |
| 2013/0053103 A1 * | 2/2013 | Kim | H04W 72/0453 | 455/561 |
| 2013/0077571 A1 * | 3/2013 | Papasakellariou | H04W 52/18 | 370/328 |
| 2013/0114562 A1 * | 5/2013 | Seo | H04W 52/146 | 370/329 |
| 2013/0136098 A1 * | 5/2013 | Li | H04W 72/23 | 370/329 |
| 2013/0344830 A1 * | 12/2013 | Coe | H04W 52/367 | 455/127.1 |
| 2014/0126403 A1 * | 5/2014 | Siomina | H04J 11/005 | 370/252 |

(56) References Cited

U.S. PATENT DOCUMENTS

| | | | | |
|---|---|---|---|---|
| 2014/0183957 | A1* | 7/2014 | Duchesneau | F01K 13/006 307/64 |
| 2014/0233457 | A1* | 8/2014 | Koutsimanis | H04L 5/0073 370/328 |
| 2014/0241236 | A1* | 8/2014 | Speight | H04W 52/46 370/315 |
| 2014/0241237 | A1* | 8/2014 | Speight | H04W 74/0833 370/315 |
| 2015/0063262 | A1* | 3/2015 | Ji | H04L 5/0058 370/329 |
| 2015/0117384 | A1* | 4/2015 | Papasakellariou | H04W 52/367 370/329 |
| 2015/0119098 | A1* | 4/2015 | Hsu | H04W 52/34 455/522 |
| 2015/0215793 | A1* | 7/2015 | Siomina | H04W 64/00 455/456.1 |
| 2015/0333854 | A1* | 11/2015 | Yang | H04B 17/373 370/252 |
| 2015/0351122 | A1* | 12/2015 | Kim | H04W 52/146 370/329 |
| 2016/0014702 | A1* | 1/2016 | Papasakellariou | H04W 52/325 370/329 |
| 2016/0100360 | A1* | 4/2016 | Liu | H04W 72/21 370/311 |
| 2016/0142898 | A1* | 5/2016 | Poitau | H04W 8/005 370/329 |
| 2016/0149679 | A1* | 5/2016 | Frenne | H04L 5/005 370/329 |
| 2016/0173148 | A1* | 6/2016 | Kazmi | H04B 1/10 455/296 |
| 2016/0242059 | A1* | 8/2016 | Lopes | H04W 24/10 |
| 2016/0262144 | A1* | 9/2016 | Kitazoe | H04W 76/10 |
| 2016/0277954 | A1* | 9/2016 | Frenne | H04W 72/541 |
| 2016/0322155 | A1* | 11/2016 | Bailey | H01F 27/366 |
| 2016/0336768 | A1* | 11/2016 | Le Paven | H02J 7/00714 |
| 2016/0352447 | A1* | 12/2016 | Koutsimanis | H04W 24/02 |
| 2016/0359509 | A1* | 12/2016 | Kazmi | H04B 1/10 |
| 2017/0201365 | A1* | 7/2017 | Elshaer | H04L 5/001 |
| 2017/0201366 | A1* | 7/2017 | Chamorro | H04W 28/0231 |
| 2017/0215195 | A1* | 7/2017 | Chamorro | H04W 72/0453 |
| 2017/0331577 | A1* | 11/2017 | Parkvall | H04B 7/0848 |
| 2017/0331670 | A1* | 11/2017 | Parkvall | H04L 41/0816 |
| 2018/0007638 | A1* | 1/2018 | Kanno | H04W 52/18 |
| 2018/0196880 | A1* | 7/2018 | Carter | G06Q 10/06312 |
| 2019/0116568 | A1* | 4/2019 | Fertonani | H04W 56/00 |
| 2019/0138934 | A1* | 5/2019 | Prakash | G06V 10/95 |
| 2019/0141647 | A1* | 5/2019 | Nimbalker | H04L 5/0048 |
| 2019/0145382 | A1* | 5/2019 | Kreutzfeldt | F03D 17/0065 73/112.01 |
| 2019/0149365 | A1* | 5/2019 | Chatterjee | H04L 25/0226 370/329 |
| 2019/0174449 | A1* | 6/2019 | Shan | H04W 60/04 |
| 2019/0174466 | A1* | 6/2019 | Zhang | H04L 5/0057 |
| 2019/0191290 | A1* | 6/2019 | Poitau | H04W 72/0446 |
| 2019/0220703 | A1* | 7/2019 | Prakash | G06V 10/95 |
| 2019/0254025 | A1* | 8/2019 | Lee | H04W 72/0446 |
| 2019/0281587 | A1* | 9/2019 | Zhang | H04W 72/23 |
| 2019/0281588 | A1* | 9/2019 | Zhang | H04B 7/0617 |
| 2019/0289552 | A1* | 9/2019 | Jain | H04B 7/0626 |
| 2019/0298084 | A1* | 10/2019 | Billings | G05B 19/042 |
| 2019/0342840 | A1* | 11/2019 | Rahman | H04L 5/0051 |
| 2019/0349960 | A1* | 11/2019 | Li | H04L 5/0055 |
| 2019/0364492 | A1* | 11/2019 | Azizi | H04W 4/021 |
| 2019/0379427 | A1* | 12/2019 | Geekie | H04B 7/0682 |
| 2019/0387409 | A1 | 12/2019 | Thangarasa et al. | |
| 2020/0074988 | A1* | 3/2020 | Park | G06N 3/045 |
| 2020/0092685 | A1* | 3/2020 | Fehrenbach | H04W 84/005 |
| 2020/0145068 | A1* | 5/2020 | Chendamarai Kannan | H04L 5/0057 |
| 2020/0163142 | A1* | 5/2020 | Ryoo | H04W 76/15 |
| 2020/0205062 | A1* | 6/2020 | Azizi | G06F 9/5072 |
| 2020/0214041 | A1* | 7/2020 | Van Phan | H04W 74/0833 |
| 2020/0229206 | A1* | 7/2020 | Badic | H04W 52/0209 |
| 2020/0236692 | A1* | 7/2020 | Lin | H04W 72/535 |
| 2020/0252255 | A1* | 8/2020 | Sorrentino | H04B 7/0456 |
| 2020/0252882 | A1* | 8/2020 | Charipadi | H04W 52/245 |
| 2020/0259693 | A1* | 8/2020 | Baldemair | H04L 27/2613 |
| 2020/0259896 | A1* | 8/2020 | Sachs | H04W 56/0065 |
| 2020/0280872 | A1* | 9/2020 | Fiorani | H04W 28/24 |
| 2020/0329518 | A1* | 10/2020 | Liu | H04B 7/022 |
| 2020/0367230 | A1* | 11/2020 | Raghavan | H04W 72/044 |
| 2020/0389876 | A1* | 12/2020 | Islam | H04L 5/0094 |
| 2020/0396024 | A1* | 12/2020 | Ganesan | H04L 1/1819 |
| 2020/0396627 | A1* | 12/2020 | Hwang | H04W 24/08 |
| 2020/0396744 | A1* | 12/2020 | Xiong | H04B 7/088 |
| 2020/0403759 | A1* | 12/2020 | Abdelghaffar | H04L 5/0092 |
| 2021/0006614 | A1* | 1/2021 | Oyman | H04L 65/756 |
| 2021/0007149 | A1* | 1/2021 | Li | H04L 5/0091 |
| 2021/0022018 | A1* | 1/2021 | Belov | H04W 24/06 |
| 2021/0045125 | A1* | 2/2021 | Mondal | H04W 80/08 |
| 2021/0051510 | A1* | 2/2021 | Chae | H04B 17/318 |
| 2021/0051594 | A1* | 2/2021 | Chae | H04W 52/242 |
| 2021/0051653 | A1* | 2/2021 | Park | H04W 8/22 |
| 2021/0051673 | A1* | 2/2021 | Chae | H04W 72/23 |
| 2021/0058826 | A1* | 2/2021 | Mao | H04W 28/088 |
| 2021/0058833 | A1* | 2/2021 | Basu Mallick | H04W 36/0055 |
| 2021/0058970 | A1* | 2/2021 | Kwak | H04W 72/23 |
| 2021/0058989 | A1* | 2/2021 | Simsek | H04L 47/283 |
| 2021/0067391 | A1* | 3/2021 | Sengupta | H04L 27/2614 |
| 2021/0068075 | A1* | 3/2021 | Uesaka | H04L 1/08 |
| 2021/0076275 | A1* | 3/2021 | Yiu | H04W 36/0088 |
| 2021/0083911 | A1* | 3/2021 | Morozov | H04L 27/2636 |
| 2021/0084482 | A1* | 3/2021 | Poitau | H04W 72/02 |
| 2021/0084536 | A1* | 3/2021 | Chou | H04W 36/0085 |
| 2021/0091878 | A1* | 3/2021 | Taherzadeh Boroujeni | H04L 1/0009 |
| 2021/0092660 | A1* | 3/2021 | Cui | H04W 24/10 |
| 2021/0092690 | A1* | 3/2021 | Bergström | H04W 52/34 |
| 2021/0092759 | A1* | 3/2021 | Xiong | H04W 72/0446 |
| 2021/0100012 | A1* | 4/2021 | Miao | H04W 72/23 |
| 2021/0105122 | A1* | 4/2021 | Xiong | H04L 5/0051 |
| 2021/0105338 | A1* | 4/2021 | Oyman | H04L 12/2876 |
| 2021/0105451 | A1* | 4/2021 | Oyman | H04N 19/597 |
| 2021/0105752 | A1* | 4/2021 | Taherzadeh Boroujeni | H04W 72/23 |
| 2021/0120524 | A1* | 4/2021 | Palle | H04W 68/005 |
| 2021/0144570 | A1* | 5/2021 | Chae | H04W 72/02 |
| 2021/0184812 | A1* | 6/2021 | MolavianJazi | H04L 1/0041 |
| 2021/0194553 | A1* | 6/2021 | Chendamarai Kannan | H04L 5/0057 |
| 2021/0194652 | A1* | 6/2021 | Khoryaev | H04L 5/06 |
| 2021/0195541 | A1* | 6/2021 | Wei | H04W 72/21 |
| 2021/0203397 | A1* | 7/2021 | Xiong | H04W 72/046 |
| 2021/0227490 | A1* | 7/2021 | Yiu | H04W 24/02 |
| 2021/0243782 | A1* | 8/2021 | Miao | H04L 5/0091 |
| 2021/0243839 | A1* | 8/2021 | Krishnaswamy | H04W 24/04 |
| 2021/0274381 | A1* | 9/2021 | Teyeb | H04L 1/1854 |
| 2021/0274556 | A1* | 9/2021 | Park | H04W 24/10 |
| 2021/0282101 | A1* | 9/2021 | Fertonani | H04W 56/0005 |
| 2021/0297199 | A1* | 9/2021 | Miao | H04L 1/1861 |
| 2021/0298048 | A1* | 9/2021 | Sosnin | H04W 72/046 |
| 2021/0320710 | A1* | 10/2021 | Koskela | H04B 17/309 |
| 2021/0331701 | A1* | 10/2021 | Hur | H04W 4/44 |
| 2021/0377919 | A1* | 12/2021 | Fong | H04L 1/1861 |
| 2022/0303914 | A1 | 9/2022 | Abdel Shahid et al. | |
| 2023/0117857 | A1 | 4/2023 | Abdel Shahid | |

OTHER PUBLICATIONS

3GPP, "Radio Resource Control (RRC); Protocol specification", TS 38.331 version 16.3.1 Release 16, available at <<https://www.etsi.org/deliver/etsi_ts/138300_138399/138331/16.03.01_60/ts_138331v160301p.pdf>>, Jan. 2021, 916 pages.

3GPP, "User Equipment (UE) radio transmission and reception; Part1: Range 1 Standalone", TS 38.101-1 version 16.6.0 Release 16, available at <<http://www.etsi.org/deliver/etsi_ts/138100_138199/13810101/16.06.00_60/ts_13810101v160600p.pdf>>, Jan. 2021, 447 pages.

Office Action for U.S. Appl. No. 17/204,754, mailed Apr. 27, 2022, Shahid, "Dynamic Switching of User Equipment Power Class", 13 pages.

(56) References Cited

OTHER PUBLICATIONS

Office Action for U.S. Appl. No. 17/204,754, mailed on Jan. 4, 2022, Shahid, "Dynamic Switching of User Equipment Power Class", 11 pages.

Office Action for U.S. Appl. No. 18/083,724, mailed on Apr. 13, 2023, Inventor #1 Wafik Abdel Shahid, "Dynamic Switching of User Equipment Power Class," 7 pages.

\* cited by examiner

DYNAMIC SWITCHING OF USER EQUIPMENT POWER CLASS

RELATED APPLICATIONS

This application is a continuation of and claims priority to U.S. patent application Ser. No. 18/083,724, filed Dec. 19, 2022, titled "DYNAMIC SWITCHING OF USER EQUIPMENT POWER CLASS," which is a continuation of and claims priority to U.S. patent application Ser. No. 17/204,754, filed Mar. 17, 2021, titled "DYNAMIC SWITCHING OF USER EQUIPMENT POWER CLASS," the entirety of both which are incorporated herein by reference.

BACKGROUND

In a telecommunication network, a user equipment (UE) can wirelessly connect to a base station in order to engage in voice calls, video calls, data transfers, or other types of communications. For example, a mobile device, such as a smart phone, can wirelessly connect to a gNB or other base station of a radio access network (RAN) to access the telecommunication network.

UEs can operate according to different power classes that are associated with different output power levels for transmissions. For example, 3GPP defines various power classes, including Power Class 3, Power Class 2, and Power Class 1.5, that define maximum output power levels for uplink transmissions. Accordingly, a UE may transmit uplink data to a base station of the RAN according to a particular power class.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
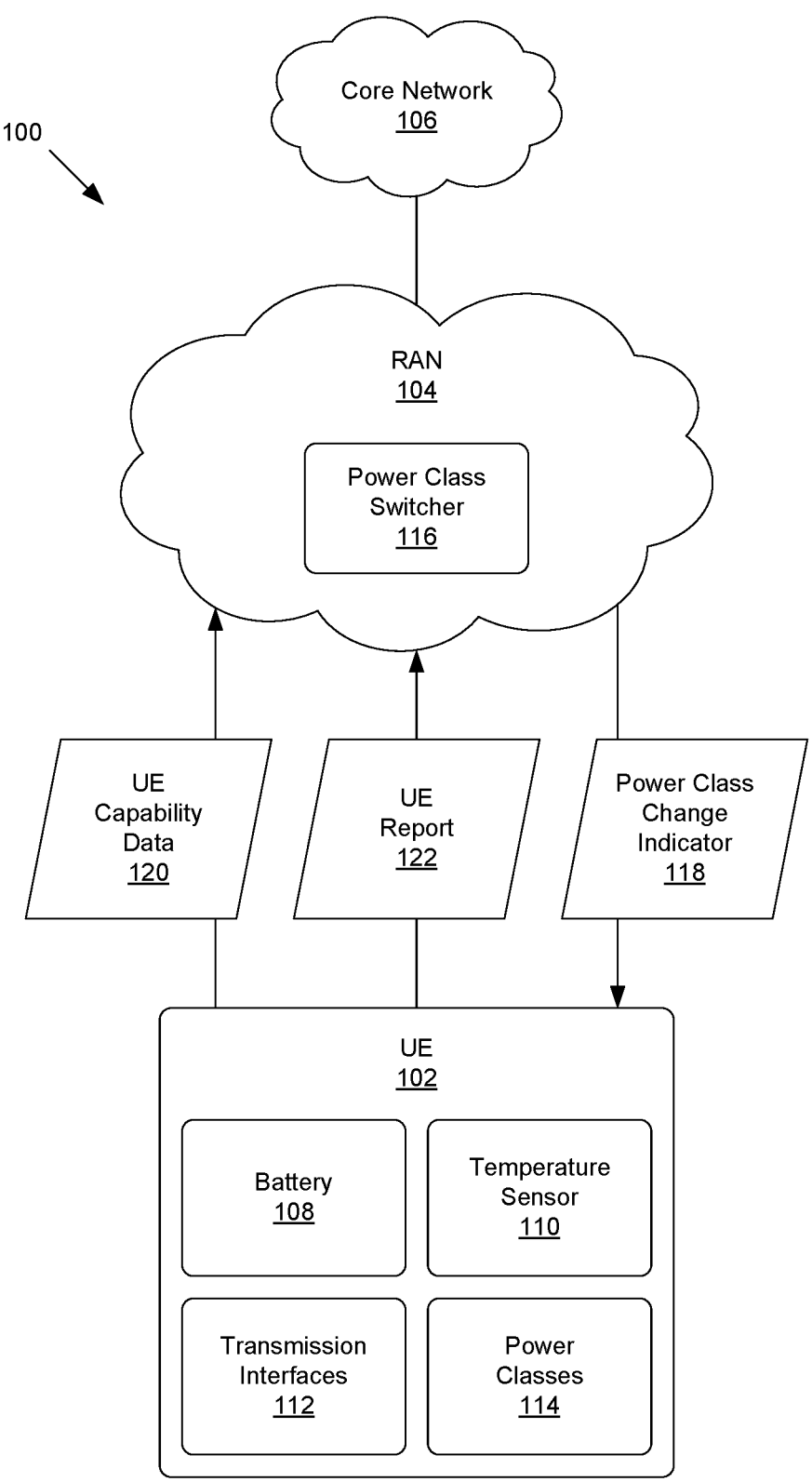
FIG. 1 shows an example network environment in which a UE can connect to a telecommunication network.

A UE can support multiple power classes. A power class can define a maximum output power, such as a maximum output power for uplink transmissions from the UE to a RAN. For example, 3GPP Power Class 3 allows uplink transmissions at up to an output power of 23 decibels relative to one milliwatt (dBm). 3GPP Power Class 2 allows uplink transmissions at up to an output power of 26 dBm. 3GPP Power Class 1.5 allows uplink transmissions at up to an output power of 29 dBm.

In some situations, transmitting at higher output power levels can have benefits relative to transmitting at lower output power levels. For instance, if a UE uses Power Class 1.5 to transmit uplink signals at up to 29 dBm, the uplink signals may propagate farther and/or through more barriers than uplink signals transmitted at up to 26 dBm according to Power Class 2. In some examples, using Power Class 1.5 may also result in higher uplink data transmission rates than could be achieved using Power Class 2.

However, in some situations, transmitting at higher output power levels can also have drawbacks relative to transmitting at lower output power levels. For instance, transmitting at higher output power levels can cause a UE to consume more power than transmitting at lower output power levels, and thereby cause the UE to drain its battery more quickly and/or cause the UE to generate more heat. Accordingly, in some situations, a UE that uses Power Class 1.5 may need to be recharged more often, and/or may have a higher risk of overheating, than a UE that uses Power Class 2.

In some systems, if a UE supports multiple power classes, the UE may be configured to select one of those power classes according to a maximum output power allowed by the RAN. For example, if a base station of the RAN indicates that the highest allowed output power for uplink transmissions in a cell is 29 dBm, and the UE supports Power Class 1.5, the UE may use Power Class 1.5 to perform all uplink transmissions at output power levels of up to 29 dBm to while the UE is connected to that base station.

However, such systems in which a UE statically selects a single power class, based on a maximum output power allowed by the RAN, can cause the UE to consume more power than may be necessary in situations in which benefits of the increased power consumption may not be apparent to the UE or to a user of the UE. For instance, using a higher uplink output power in situations in which a lower output power would suffice may drain the UE's battery more quickly, cause the UE to generate more heat and potentially risk overheating or damaging the battery, and/or otherwise negatively impact the UE. Accordingly, there may be drawbacks to statically using the highest allowable output power that is permitted by the RAN.

As an example, as noted above, a UE may statically select Power Class 1.5 because a base station indicates that uplink transmissions are permitted in a cell at output power levels of up to 29 dBm. However, if the UE is located at a position in the cell that is relatively close to the base station, the UE is unlikely to benefit from a larger signal propagation range that Power Class 1.5 may provide over Power Class 2. Based on the position of the UE, the smaller signal propagation range associated with Power Class 2 may be sufficient for uplink signals sent by the UE to reach the base station. Accordingly, in this situation, the UE statically using Power Class 1.5 instead of Power Class 2 may not provide appreciable advantages to the UE, or to a user of the UE. However, the UE statically using Power Class 1.5 instead of Power Class 2 may lead to appreciable disadvantages caused by higher power consumption rates, such as decreased battery life and/or increased heat generation.

The systems and methods described herein can allow a base station, or other element of the RAN, to dynamically change the power class used by a UE, based on metrics reported by the UE and/or other data. For example, if the base station determines that the UE may benefit from transmitting at higher output power levels, the base station may instruct the UE to use Power Class 1.5. However, if the base station later determines that the UE would benefit from transmitting at lower output power levels, for instance to save battery life and/or to generate less heat, the base station may instruct the UE to switch to using Power Class 2 instead of Power Class 1.5.

FIG. 1 shows an example network environment 100 in which a UE 102 can connect to a telecommunication network to engage in communication sessions for voice calls, video calls, messaging, data transfers, and/or any other type of communication. The telecommunication network can include at least one radio access network (RAN) 104. The UE 102 can wirelessly connect to a base station or other access point of the RAN 104. The telecommunication network can also include at least one core network 106 linked to the RAN 104, such that the UE 102 can access the core network 106 via a connection to the RAN 104.

The UE 102, the RAN 104, and/or the core network 106 can be compatible with one or more types of radio access technologies, wireless access technologies, protocols, and/or standards. For example, the UE 102, the RAN 104, and/or the core network 106 can be compatible with fifth generation (5G) New Radio (NR) technology, Long-Term Evolution (LTE)/LTE Advanced technology, other fourth generation (4G) technology, High-Speed Data Packet Access (HSDPA)/ Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology or wireless access technology.

In some examples, the RAN 104 and/or the core network 106 may be based on LTE technology. For instance, the RAN 104 may be an LTE access network known as an Evolved UMTS Terrestrial Radio Access Network (E-UTRAN), and can include one or more LTE base stations known as evolved Node Bs (eNBs). The core network 106 may also be an LTE packet core network, known as an Evolved Packet Core (EPC). In other examples, the RAN 104 and/or the core network 106 may be based on 5G technology. For example, the RAN 104 may be a 5G access network that includes one or more 5G base stations knowns as gNBs, and the core network 106 may be a 5G core network.

In some examples, the RAN 104 and the core network 106 may be based on the same radio access technology. However, in other examples, the RAN 104 and the core network 106 may be based on different radio access technologies. For instance, in some examples a 5G access network may be linked to an LTE core network, or an LTE access network may be linked to a 5G core network.

The UE 102 can be any device that can wirelessly connect to the telecommunication network. In some examples, the UE 102 can be a mobile phone, such as a smart phone or other cellular phone. In other examples, the UE 102 can be a personal digital assistant (PDA), a media player, a tablet computer, a gaming device, a smart watch, a hotspot, a personal computer (PC) such as a laptop, desktop, or workstation, or any other type of computing or communication device.

As shown in FIG. 1, the UE 102 can have a battery 108, a temperature sensor 110, and one or more transmission interfaces 112. The UE 102 can also support multiple power classes 114, and at any point in time can operate according to a power class selected from the multiple power classes 114 supported by the UE 102. As will be discussed further below, a base station such as a gNB or eNB, or another element of the RAN 104, can include a power class switcher 116 that is configured to dynamically determine which one of the power classes 114 the UE 102 should use. Based on a power class determination by the power class switcher 116, the RAN 104 can transmit a power class change indicator 118 to the UE 102. The power class change indicator 118 may identify a specific power class the UE 102 should use, or instruct the UE 102 to change from using a current power class to using a different power class. The power class change indicator 118 provided by the RAN 104 can accordingly cause the UE 102 to dynamically change a power class associated with the transmission interfaces 112, for instance by changing a maximum output power for uplink transmissions. Other elements of the UE 102 are illustrated in greater detail in FIG. 4, and are described in detail below with reference to that figure.

The battery 108 can store energy used to power functions of the UE 102. The battery 108 can be a lithium-ion (Li-ion) battery, a lithium-ion polymer (LiPo) battery, a nickel cadmium (NiCd) battery, a nickel-metal hydride (NiMH) battery, or other type of battery. The battery 108 may be rechargeable. For instance, the battery 108 can charge when the UE 102 is connected to a wall outlet, a portable charger, or another external power source. However, operations of the UE 102 can also use energy and thus drain the battery 108, for instance when the battery 108 is not charging.

In some examples, the UE 102 may include the temperature sensor 110. The temperature sensor 110 may be a thermocouple, thermistor, resistance temperature detector (RTD), semiconductor-based integrated circuit, thermometer, and/or any other type of temperature sensor. The temperature sensor 110 may be configured to measure or derive the internal temperature of the UE 102 or temperatures of one or more individual components of the UE 102, such as a temperature of the battery 108, a temperature of a central processing unit (CPU) or other processor, or a temperature of any other component of the UE 102. In some examples, the UE 102 may have multiple temperature sensors, such as a CPU temperature sensor and a battery temperature sensor. In other examples, the UE 102 may lack a dedicated temperature sensor, but heat generated by the UE 102 may be estimated based on how quickly the battery 108 drains and/or other UE power consumption metrics.

The transmission interfaces 112 of the UE 102 can be configured to establish wireless connections with the RAN 104, and to perform uplink and/or downlink data transmissions via the wireless connections. For examples, the transmission interfaces 112 can include radio interfaces, transceivers, modems, interfaces, antennas, and/or other components that perform or assist in exchanging radio frequency (RF) communications with one or more base stations of the RAN 104. The transmission interfaces 112 may be compatible with one or more radio access technologies, such as 5G NR radio access technologies and/or LTE radio access technologies.

In some examples, the transmission interfaces 112 can establish a single connection with a base station of the RAN 104 for uplink transmissions and/or downlink transmissions. In other examples, the transmission interfaces 112 can establish multiple connections with one or more base stations of the RAN 104 for uplink transmissions and/or downlink transmissions. For example, the transmission interfaces 112 may have multiple antennas, such that the UE 102 may use multiple-input multiple-output (MIMO) techniques to exchange different data streams with a base station via different antennas.

The UE 102 may be configured to operate according to any of two or more power classes 114. A power class may indicate allowable power levels and/or other power configurations for transmissions via the transmission interfaces 112, such as a maximum output power for uplink transmissions.

As an example, the UE 102 may be configured to operate according to two or more of: 3GPP Power Class 1.5, 3GPP Power Class 2, or 3GPP Power Class 3. Power Class 1.5 can permit uplink transmissions at up to 29 dBm. Power Class 2 can permit uplink transmissions at up to 26 dBm. Power Class 3 can permit uplink transmissions at up to 23 dBm. Because a decibel is a logarithmic value, a 3 dBm increase in output power can be equivalent to doubling the output power. Accordingly, using Power Class 2 may allow the UE 102 to double its uplink output power relative to using Power Class 3. Similarly, using Power Class 1.5 may allow the UE 102 to double its uplink output power relative to using Power Class 2. In some examples, the UE 102 can be considered a High-Power or High-Performance UE (HPUE) if the UE 102 is configured to use Power Class 1.5 and/or Power Class 2.

Power Class 1.5 can allow MIMO dual transmission paths at 26 dBm each, for a total uplink transmission power of 29 dBm. Alternatively, Power Class 1.5 may allow a single uplink transmission path at up to 29 dBm. In some examples, Power Class 1.5 may allow 25% duty cycle for uplink activity when uplink transmission power is at the maximum of 29 dBm. This can allow the UE 102 to stay below a Specific Absorption Rate (SAR) limit. If the UE 102 approaches or exceeds the SAR limit, the UE 102 can use additional maximum power reduction (AMPR) techniques to lower output power.

Power Class 2 can allow MIMO dual transmission paths at 23 dBm each, for a total uplink transmission power of 26 dBm. Alternatively, Power Class 2 may allow a single uplink transmission path at up to 26 dBm. In some examples, Power Class 2 may allow 50% duty cycle for uplink activity when uplink transmission power is at the maximum of 26 dBm, which may allow the UE 102 stay below a SAR limit.

Some power classes 114 may be associated with specific duplexing modes and/or specific frequency bands. For instance, Power Class 3 may be defined for use with LTE frequency bands that are associated with frequency division duplexing (FDD) or time division duplexing (TDD). However, Power Class 2 and Power Class 1.5 may not be defined for use with FDD frequency bands, and may instead be defined for use with TDD frequency bands. For example, Power Class 1.5 may be defined for use with 5G TDD frequency bands such as n40, n41, n77, n78, and n79.

The power class used by the UE 102 can affect signal quality, connection reliability, signal propagation range, transmission rates, and/or other transmission metrics. For example, transmitting at higher output power levels can allow signals to propagate farther, and/or more easily pass through walls or other barriers, relative to transmitting at lower output power levels. In some situations, transmitting at higher output power levels may also result in higher uplink data transmission rates than could be achieved by transmitting at higher output power levels. Such benefits of transmitting at higher output power levels instead of lower output power levels may be appreciated by a user of the UE 102, and thus offer an improved user experience, as the user may perceive that the UE 102 is able to connect to the telecommunication network more reliably and/or with higher data speeds.

However, the power class used by the UE 102 may also affect the power consumption of the UE 102. The power consumption of the UE 102 may in turn affect how quickly the battery 108 drains, and/or affect the temperature of the UE 102. For example, as noted above, Power Class 1.5 may use twice the uplink output power relative to Power Class 2. Accordingly, if the UE 102 uses Power Class 1.5, the battery 108 may drain more quickly than if the UE 102 had used Power Class 2. Similarly, the temperature sensor 110 may indicate that the UE 102 generates more heat when the UE 102 uses Power Class 1.5 relative to when the UE 102 uses Power Class 2. The UE 102 may thus operate at higher temperatures when using Power Class 1.5 instead of Power Class 2, which may degrade overall performance of the UE 102 and/or put the UE 102 at a higher risk of overheating. Such drawbacks of transmitting at higher output power levels may be appreciated by a user of the UE 102, and thus offer a degraded user experience, as the user may perceive that the battery 108 of the UE 102 does not last as long between charges or that performance of the UE 102 suffers overall at higher heat levels.

As such, a power class that allows a higher output power than another power class may have advantages and disadvantages. For instance, Power Class 1.5 may result in advantages relative to Power Class 2, such as a larger signal coverage area and/or higher uplink data transmission speeds. However, Power Class 1.5 may also have disadvantages relative to Power Class 2, such as increased power consumption or increased heat levels at the UE 102.

In some situations, the advantages of a power class that allows a higher output power than another power class may outweigh the corresponding disadvantages. However, in other situations, the disadvantages of that power class may outweigh its advantages. For instance, if the UE 102 is located at a position that is relatively close to a gNB of the RAN 104, Power Class 2 may provide a sufficient signal propagation range for uplink transmissions to reach the gNB. In this situation, the UE 102 may not benefit from an increased signal propagation range that Power Class 1.5 may provide over Power Class 2. The UE 102 may also drain the battery 108 more quickly, and/or generate more heat, due to the use of Power Class 1.5 instead of Power Class 2, without any appreciable user experience benefit or other benefit to the UE 102.

Accordingly, the power class switcher 116 of the RAN 104 can be configured to dynamically determine which power class the UE 102 should use, and to provide a corresponding power class change indicator 118 to the UE 102. The power class change indicator 118 may instruct the UE 102 to use a specific power class, or instruct the UE 102 to switch from a current power class to a different power class.

The power class switcher 116 can store data indicating which set of power classes 114 the UE 102 supports. The power class switcher 116 may use UE capability data 120 provided by the UE 102 during an initial network registration process, and/or at other times, to determine which power classes 114 the UE 102 supports. The UE capability data 120 can be a Radio Resource Control (RRC) message, or other type of message, that indicates capabilities of the UE 102, including an indication of the power classes 114 that the UE 102 supports. For example, when the UE 102 registers with a gNB, the UE 102 can provide UE capability data 120 to the gNB indicating that the UE 102 supports both Power Class 1.5 and Power Class 2.

In some examples, the UE 102 may be configured to, by default, initially select a power class based on an output power limit that is broadcast by a base station of the RAN 104 to all UEs in range of that base station. For example, a gNB may broadcast a System Information Block #1 (SIB1), which may be received by any UE in range of the gNB. The broadcast SIB1 may indicate a maximum allowable output power for uplink transmissions in the cell. The UE 102 can, by default, select one of its supported power levels that corresponds to the maximum allowable output power.

For example, a SIB1 broadcast by a gNB may indicate that the gNB permits uplink transmissions to be sent by UEs at output powers up to 29 dBm (corresponding to Power Class 1.5). In this example, if the UE 102 supports both Power Class 1.5 and Power Class 2, the UE 102 may initially set itself to use Power Class 1.5 because Power Class 1.5 also allows uplink transmissions at up to 29 dBm.

A base station or other element of the RAN 104 may infer the power class used by the UE 102 upon initial network registration based on the output power limit broadcast by the RAN 104 and based on the UE capability data 120 provided by the UE 102 to the RAN 104. For example, if a base station is configured to broadcast a SIB1 indicating a 29 dBm output power limit, and the UE 102 provides UE capability data 120 during network registration with the base station that indicates that the UE 102 supports both Power Class 1.5 and Power Class 2, the base station can determine that the UE 102 will initially use Power Class 1.5 according to the SIB1 broadcast by the RAN 104. The base station may store information tracking which power class the UE 102 is currently using, and may initialize this tracking information based on the initial power class inferred by the base station based on the output power limit broadcast by the base station and the UE capability data 120.

After the UE 102 registers with a base station of the RAN 104, the UE 102 can periodically or occasionally send a UE report 122 to the base station, or other element of the RAN 104. The UE report 122 can be an RRC message, or other type of message, that indicates metrics and/or other information associated with the UE 102, as discussed further below with respect to FIG. 3. In some examples, the UE report 122 can be an RRC message that includes UE Assistance Information.

The power class switcher 116 of the RAN 104 can evaluate one or more types of information in the UE report 122, and/or other information associated with other connected UEs or the cell overall, and determine whether the UE 102 should change from its current power class to a different power class. If the power class switcher 116 does determine that the UE 102 should change to a different power class, the power class switcher 116 can cause the base station, or other RAN element, to send the power class change indicator 118 to the UE 102. The RAN 104 may also update information that tracks which power class the UE 102 is using, based on the power class change indicator 118 sent to the UE 102.

In some examples, the power class change indicator 118 can be sent by the RAN 104 to the UE 102 as an RRC reconfiguration message, or other type of message. For example, a gNB can send the UE 102 an RRC reconfiguration message that contains an instruction to use a specific power class, or that contains an instruction to switch from a current power class to a different power class.

As a non-limiting example, the UE 102 may have reported to a gNB in UE capability data 120 that the UE 102 supports both Power Class 1.5 and Power Class 2. The UE 102 may have initially started using Power Class 1.5 based on a SIB1 broadcast by a gNB. However, the gNB may determine, based on a UE report 122 and/or other data, that the UE 102 should change from using Power Class 1.5 to using Power Class 2. The gNB may accordingly send an RRC reconfiguration message that instructs the UE 102 to switch from its current power class to a different power class. Accordingly, the UE 102 may follow the instruction in the RRC reconfiguration message, and dynamically switch from using Power Class 1.5 to using Power Class 2. In this example, the RRC reconfiguration message may not directly indicate that the UE 102 should use Power Class 2, but instead instruct the UE 102 to change between the two power classes it supports. Because the UE 102 was using Power Class 1.5, the RRC reconfiguration message may implicitly instruct the UE 102 to dynamically change to using Power Class 2. However, in other examples, the RRC reconfiguration message may directly indicate that the UE 102 should use a specific power class, such as Power Class 2.

In other examples, the power class change indicator 118 can be sent by the RAN 104 to the UE 102 as information that can be interpreted by the UE 102 at the physical layer. Accordingly, the UE 102 may be able to interpret the power class change indicator 118 at the physical layer, and/or initiate a corresponding change in the power class of the UE 102, more quickly than if the power class change indicator 118 were sent as an RRC reconfiguration message or other message that the UE 102 interprets at an RRC layer or other protocol layer above the physical layer.

Figure 2:
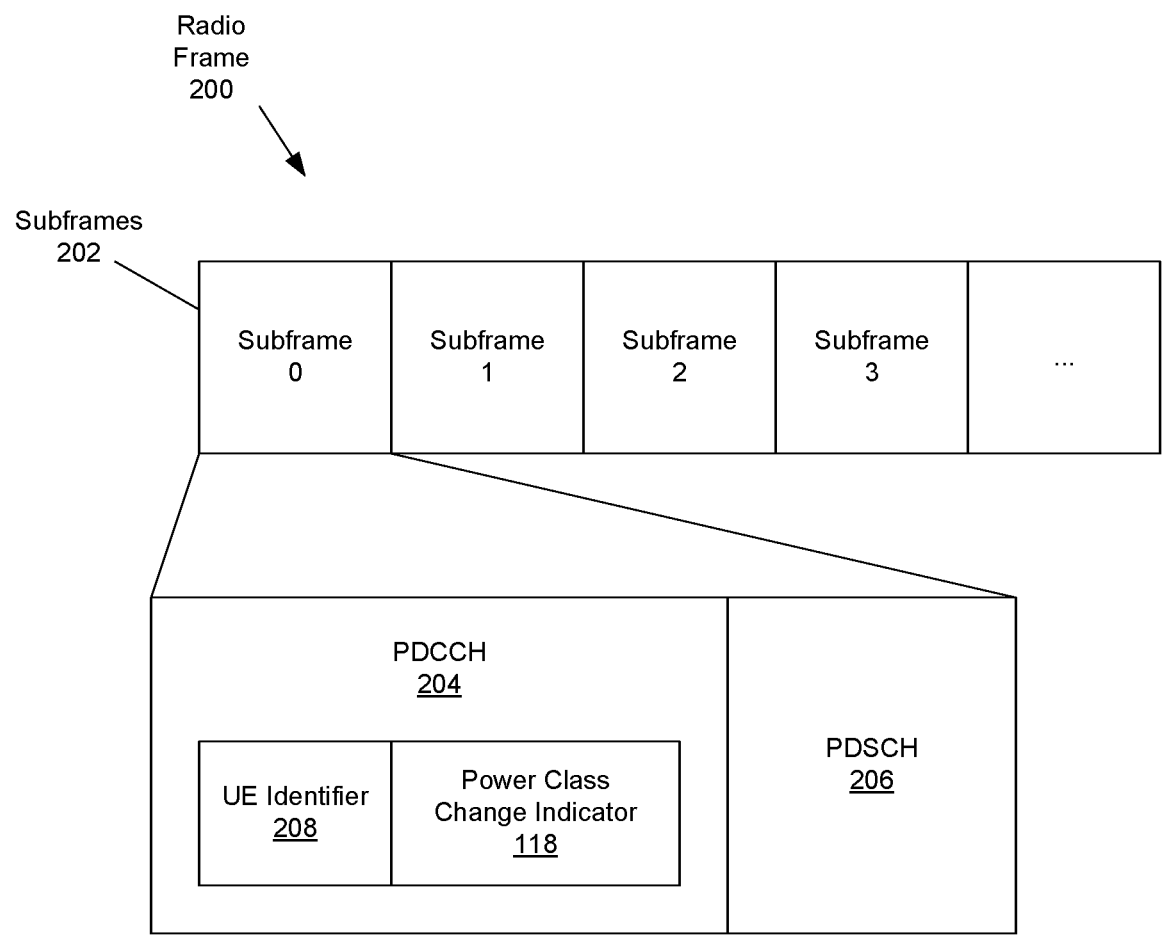
FIG. 2 shows an example of a radio frame that can include a power class change indicator.

For example, the power class change indicator 118 can be included by a base station, or other RAN element, in a radio frame 200, as shown in FIG. 2. Accordingly, in some examples the UE 102 may locate, interpret, and/or follow the power class change indicator 118 at the physical layer, without passing the power class change indicator 118 to an RRC layer or other higher protocol layer for interpretation.

The radio frame 200 can include a series of subframes 202. For example, the radio frame 200 can include ten subframes 202. An individual subframe may include data in a Physical Downlink Control Channel (PDCCH) 204. An individual subframe may also include other types of data, such as data in a Physical Downlink Shared Channel (PDSCH) 206 or a Physical Uplink Shared Channel (PUSCH), depending on the type of subframe.

The PDCCH 204 may carry downlink control information (DCI). The DCI can indicate PDSCH transmission resource scheduling, PUSCH transmission resource scheduling, slot format information, and/or other types of information. For instance, if the PDCCH 204 includes a UE identifier 208 of the UE 102, the UE 102 can use DCI to determine how to locate and interpret downlink data for the UE 102 that is encoded in the PDSCH 206, how to encode and send uplink data in PUSCH of a subframe, or otherwise how to interpret the structure of the radio frame 200. In some examples, the UE identifier 208 may be a cell-radio network temporary identifier (C-RNTI) that is assigned to the UE 102 by a base station of the RAN 104 when the UE 102 initially connects to the base station.

As shown in FIG. 2, the base station can also include the power class change indicator 118 in the PDCCH 204, in association with the UE identifier 208 of the UE 102. The PDCCH 204 may include different UE identifiers, and different corresponding power class change indicators, for different UEs that have registered with the base station. Accordingly, if the UE 102 receives the radio frame 200 and determines at the physical layer that the UE identifier 208 of the UE 102 is present in the PDCCH 204, the UE 102 can identify and follow the corresponding power class change indicator 118 associated with the UE identifier 208 in the PDCCH 204.

In some examples, the power class change indicator 118 in the PDCCH 204 may be expressed using a single bit. In these examples, one binary value for the bit may indicate that the UE 102 should continue using its current power class, while the other binary value for the bit may indicate that the UE 102 should change to another power class.

As a non-limiting example, the UE 102 may support both Power Class 1.5 and Power Class 2. If the UE 102 is currently using Power Class 1.5, a value of "0" for the power class change indicator 118 in the PDCCH 204 may indicate that the UE should continue using Power Class 1.5. However, a value of "1" for the power class change indicator 116 in the PDCCH 204 may indicate that the UE 102 should switch to using Power Class 2. The meanings of these binary values can be reversed in some examples, such that a value of "0" instead indicates that the UE 102 should switch to a different power class, and a value of "1" indicates that the UE 102 should continue using its current power class.

In other examples, the power class change indicator 118 in the PDCCH 204 may be expressed using multiple bits. Different possible combinations of values for the multiple bits of the power class change indicator 118 in the PDCCH 204 may map to corresponding instructions regarding the power class of the UE 102, or map to specific corresponding power classes. For example, a value of "00" may indicate that the UE 102 should use Power Class 3, a value of "01" may indicate that the UE 102 should use Power Class 2, and a value of "10" may indicate that the UE 102 should use Power Class 1.5.

Figure 3:
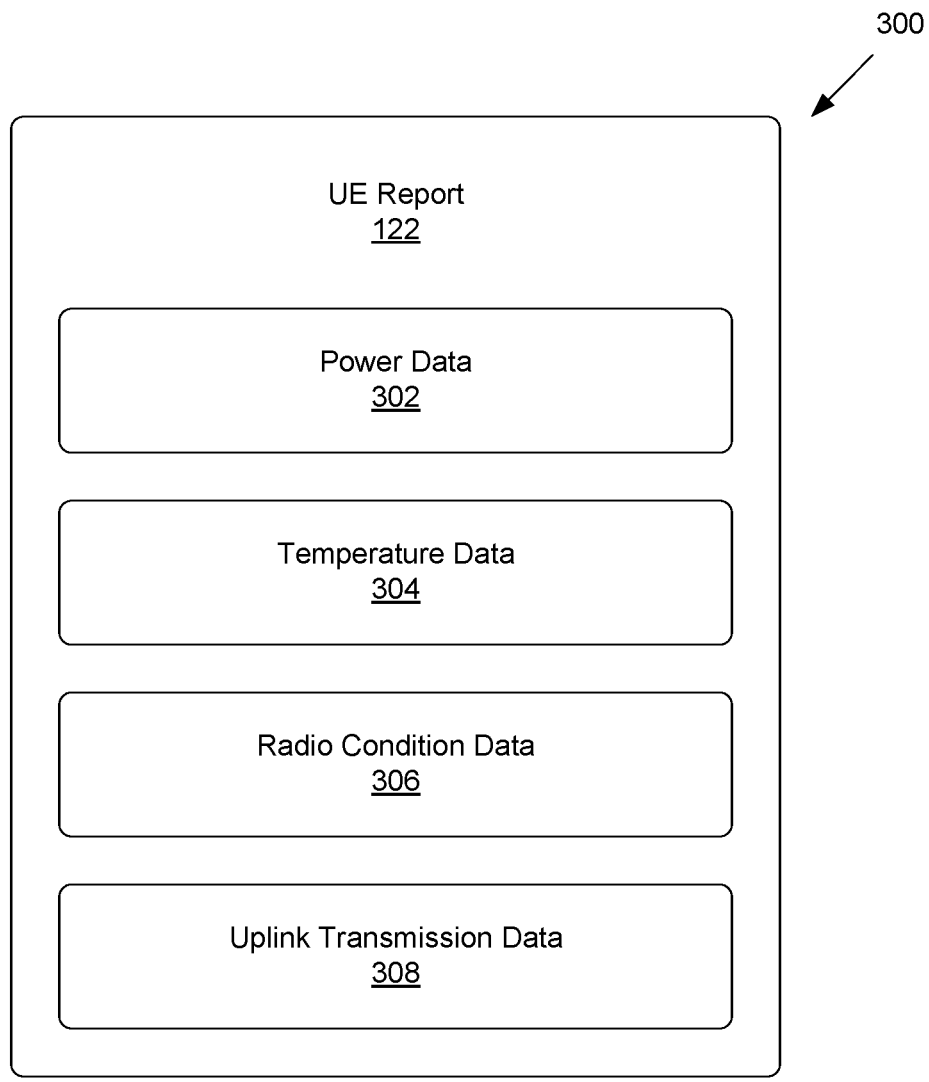
FIG. 3 show an example of metrics and other data that can be included in a UE report sent by the UE to a RAN.

FIG. 3 show an example 300 of metrics and other data that can be included in the UE report 122 sent by the UE 102 to the RAN 104. The UE report 122 can include one or more of: power data 302, temperature data 304, radio condition data 306, uplink transmission data 308, or other types of information. As discussed above, the power class switcher 116 can determine, based on information in the UE report 122 and/or other data, whether the UE 102 should change from its current power class to a different power class. If the power class switcher 116 does determine that the UE 102 should change to a different power class, the power class switcher 116 can cause the RAN 104 to send the power class change indicator 118 to the UE 102.

Power data 302 can include information about the power consumption of the UE 102. For example, the power data 302 may indicate rates at which the UE 102 has consumed power over one or more periods of time. Such power consumption rates may indicate how quickly the UE 102 is draining the battery 108. The power data 302 may also indicate current power levels of the battery 108, such as an indication of how much power is stored in the battery 108 and/or a current battery level relative to an overall battery capacity. For instance, the power data 302 may indicate that the battery 108 is currently charged to a level that is 75% full. In some examples, the power data 302 may also indicate power headroom levels associated with the UE 102, such as a measure of how much power is available for transmissions in addition to power currently being used for transmissions.

The power class switcher 116 may, in some situations, determine whether to dynamically change the power class used by the UE 102 based in part on the power data 302 in the UE report 122. For example, the power class switcher 116 may be configured with one or more battery power thresholds that correspond with one or more power classes 114. By way of a non-limiting example, if the power data 302 reported by the UE 102 indicates that the battery 108 of the UE 102 is charged to above a particular threshold, such as above 50%, the power class switcher 116 may be configured to instruct the UE 102 to use Power Class 1.5. However, if the power data 302 reported by the UE 102 indicates that the battery 108 of the UE 102 is charged to a level below the 50% threshold, the power class switcher 116 may be configured to instruct the UE 102 to use Power Class 2 in order to conserve battery life of the UE 102. As another non-limiting example, the power class switcher 116 may be configured to instruct the UE 102 to use Power Class 1.5 if the charge level of the battery 108 is above a first threshold, instruct the UE 102 to use Power Class 2 if the charge level of the battery 108 is below a second threshold, and use one or more other factors to select between Power Class 1.5 and Power Class 2 if the charge level of the battery 108 is between the first threshold and the second threshold.

Temperature data 304 can, in some examples, include temperature data based on measurements taken by the temperature sensor 110, such as temperatures measurements associated with the battery 108, a CPU, and/or other components of the UE 102, and/or rates indicating how measured temperatures or amounts of heat generated by the UE 102 have been increasing or decreasing over time. In other examples, the temperature data 304 in the UE report 122 can be inferred or estimated based on power consumption rates rather than temperature measurements associated with the temperature sensor 110. In still other examples, the UE report 122 can omit temperature data 304, but the RAN 104 can infer temperatures and/or heat generation metrics associated with the UE 102 based on power consumption rates or other power data 302 provided in the UE report 122.

The power class switcher 116 may, in some situations, determine whether to dynamically change the power class used by the UE 102 based in part on the temperature data 304 included in the UE report 122 or determined by the RAN 104 based on power data 302 in the UE report 122. For example, if the UE 102 is using Power Class 1.5, and the temperature data 304 indicates that the UE 102 is operating at a temperature above a temperature threshold, the power class switcher 116 may instruct the UE 102 to switch to using Power Class 2 in order to decrease the power consumption of the UE 102 and thereby lower the operating temperature of the UE 102.

Radio condition data 306 can include metrics or other key performance indicators (KPIs) associated with radio conditions associated with the UE 102. For example, the UE 102 may include, in the UE report 122, signal-to-interference-plus-noise (SINR) metrics, signal-to-noise (SNR) metrics, received signal strength indicator (RSSI) values, reference signal received power (RSRP) values, reference signal received quality (RSRQ) values, and/or other signal quality or signal strength metrics measured by the UE 102. In some examples, one or more elements of the RAN 104 may separately measure or determine signal strength or signal quality metrics associated with transmissions between the RAN 104 and the UE 102.

In some examples, the radio condition data 306 may indicate a location of the UE 102 relative to a base station of the RAN 104. For example, the base station may determine that the UE 102 is at a near-cell position relatively close to the base station if signal strength metrics are relatively strong, that the UE 102 is at a far-cell position relatively far away from the base station if signal strength metrics are relatively weak, or that the UE 102 is at a mid-cell position if signal strength metrics are in an intermediate range. In some examples, base station or other RAN element can also, or alternately, determine an estimated location of the UE 102 based on Global Positioning System (GPS) coordinates included in the UE report 122, based on triangulation methods, and/or any other location determination method.

In some examples, the radio condition data 306 may indicate whether the UE 102 is indoors or outdoors. For example, relatively poor signal strength metrics may indicate that the UE 102 is inside a building, and walls of the building are interfering with signal propagation.

The power class switcher 116 may, in some situations, determine whether to dynamically change the power class used by the UE 102 based in part on the radio condition data 306 included in the UE report 122 and/or determined by the RAN 104. As an example, if the UE 102 is currently using Power Class 1.5, and relatively strong signal strength and/or signal quality metrics in the radio condition data 306 indicate that the UE 102 is likely outside and/or at a mid-cell or near-cell position, the power class switcher 116 may determine that Power Class 2 would be sufficient for uplink signals from the UE 102 to reach a base station. Accordingly, in order to preserve battery life of the UE 102 and/or decrease the amount of heat produced by the UE 102, the power class switcher 116 may transmit the power class change indicator 118 with a value that instructs the UE 102 to dynamically change from using Power Class 1.5 to using Power Class 2.

As another example, if the UE 102 is currently using Power Class 1.5, and relatively poor signal strength and/or signal quality metrics in the radio condition data 306 indicate that the UE 102 is likely inside and/or at a far-cell position, the power class switcher 116 may determine the UE 102 should continue using Power Class 1.5 to maintain current chances of uplink signals reaching the base station. In this situation, the power class switcher 116 may avoid transmitting the power class change indicator 118 to the UE 102 such that the UE 102 continues to use Power Class 1.5, or may transmit the power class change indicator 118 with a value that instructs the UE 102 to continue to use its current power class.

However, if the UE 102 is instead currently using Power Class 2, and the radio condition data 306 indicates that the UE 102 is likely inside and/or at a far-cell position, the power class switcher 116 may determine that the UE 102 should instead use Power Class 1.5 to increase the output power for of uplink transmissions and increase the likelihood of uplink transmissions reaching the base station. Accordingly, in this situation, the power class switcher 116 may transmit the power class change indicator 118 to the UE 102 with a value that instructs the UE 102 to dynamically change from using Power Class 2 to using Power Class 1.5.

Uplink transmission data 308 can include metrics, KPIs, or other data associated with uplink transmissions that have been performed and/or are to be performed, by the UE 102. For example, uplink transmission data 308 may indicate buffer fullness levels associated with pending uplink transmissions. The uplink transmission data 308 may also indicate amounts and/or types of pending uplink data the UE 102 will be transmitting. For example, the uplink transmission data 308 may indicate that the UE 102 will be transmitting a large upload file, and/or relatively small heartbeat messages. In some examples, the uplink transmission data 308 can also indicate throughput levels measured by the UE 102. A base station or other RAN element may also, or alternately, measure or derive throughput levels associated with the UE 102.

The power class switcher 116 may, in some situations, determine whether to dynamically change the power class used by the UE 102 based in part on the uplink transmission data 308 included in the UE report 122 and/or determined by the RAN 104. As an example, the UE 102 may currently be using Power Class 2, and uplink buffer fullness levels reported by the UE 102 in UE reports may indicate that the UE's uplink buffer is continuously full despite significantly uplink resources allocated by the RAN 104 to the UE 102. In this situation, the power class switcher 116 may determine that Power Class 1.5 could allow the UE 102 to use more output power for uplink transmissions and transmit data from its uplink buffer more quickly, thereby lowering the fullness level of the UE's uplink buffer and increasing uplink throughput from the UE 102 overall. Accordingly, the power class switcher 116 may transmit the power class change indicator 118 to the UE 102 to instruct the UE 102 to dynamically change from using Power Class 2 to using Power Class 1.5. However, if the UE's buffer fullness level is below a buffer fullness threshold, the current uplink throughput associated with the UE may be sufficient and the power class switcher 116 may determine that the UE 102 should continue using Power Class 2.

In some examples, the power class switcher 116 can use UE reports provided by multiple UEs connected to a base station of the RAN 104, and/or other types of data, to determine overall metrics associated with a cell. For example, the power class switcher 116 may use SINR metrics or other interference metrics associated with a set of UEs in a cell to determine an overall interference level within the cell. The power class switcher 116 may be configured to determine power classes for different UEs based on UE reports provided by the different UEs, and/or based on overall cell metrics. For example, although a set of UEs may all be located at near-cell positions, and the power class switcher 116 may determine that Power Class 2 would provide sufficient signal propagation ranges for all of the near-cell UEs, the power class switcher 116 may determine that instructing all of the near-cell UEs to use Power Class 2 would increase overall interference levels in the cell. Accordingly, the power class switcher 116 may instruct some of the near-cell UEs to use Power Class 1.5 and other near-cell UEs to use Power Class 2, as the use of different power classes by different subsets of UEs may reduce overall interference levels in the cell.

The power class switcher 116 may be configured to evaluate any or all of the factors described herein to dynamically determine which power class the UE 102 should use, and/or whether to instruct the UE 102 to change its power class. For example, if a SINR value reported in radio condition data 306 indicates that the UE 102 may be indoors, and a power headroom value reported in power data 302 indicates that the UE 102 has sufficient power headroom to use Power Class 1.5, the power class switcher 116 may instruct the UE 102 to change from using Power Class 2 to using Power Class 1.5.

In some examples, the power class switcher 116 may evaluate different types of factors against different thresholds to determine which power class the UE 102 should use, for instance as discussed below with respect to FIG. 6. In other examples, the power class switcher 116 may assign different weights to different types of factors, and use a weighted combination of the factors to determine which power class the UE 102 should use. For instance, the power class switcher 116 may be configured to weight factors associated power data 302 and/or temperature data 304 more heavily than factors associated with radio condition data 306 and/or uplink transmission data 308. Accordingly, even if the power class switcher 116 determines from uplink transmission data 308 that the UE 102 may benefit from increased uplink throughput if the UE 102 changed from using Power Class 2 to Power Class 1.5, the power class switcher 116 may weight power data 302 more heavily and may determine that the UE 102 should continue to use Power Class 2 because Power Class 1.5 would increase the power consumption of the UE 102 and drain the battery 108 too quickly. In some examples, factors evaluated the power class switcher 116, thresholds associated with the factors, the order in which the factors are evaluated, and/or weights assigned to the factors can be determined by a machine learning model based on historical data, as discussed below with respect to FIG. 7.

Overall, the power class switcher 116 can evaluate data in the UE report 122 to dynamically determine whether the UE 102 should change power classes. The power class switcher 116 can use the power class change indicator 118 to dynamically instruct the UE 102 to use a particular power class selected by the power class switcher 116 from a set of power classes 114 noted by the UE 102 in the UE capability data 120.

In some examples, the power class switcher 116 can receive new UE reports from the UE 102 periodically or occasionally, and can also determine whether to change the UE's power class on a periodic or occasional basis. For example, if the power class switcher 116 is configured to provide power class change indicators in radio frames, such that a power class change indicator is interpretably the UE 102 at a physical layer as discussed above with respect to FIG. 2, the power class switcher 116 may evaluate whether to include a power class change indicator that instructs the UE 102 to change its power class with respect to every radio frame transmitted by a base station, every ten radio frames transmitted by the base station, every hundred radio frames transmitted by the base station, or at any other interval.

In other examples in which the power class switcher 116 is configured to provide power class change indicators in RRC reconfiguration messages or other higher-layer messages that the UE 102 may not be configured to process as quickly as physical layer information, the power class switcher 116 may evaluate whether to send a power class change indicator that instructs the UE 102 to change its power class at the same or longer intervals, such as with respect to every hundred radio frames transmitted by the base station, every two hundred radio frames transmitted by the base station, every five hundred radio frames transmitted by the base station, or at any other interval.

In some examples, the power class switcher 116 may evaluate whether to send a power class change indicator that instructs the UE 102 to change its power class at intervals selected based on data provided by the UE 102 in UE reports. For example, if power data 302 reported by the UE 102 indicates that the battery 108 is charged to above a threshold level, the power class switcher 116 may send power class change indicators that cause the UE 102 to change its power class relatively frequency. However, if the power data 302 indicates that the battery 108 has a charge level below the threshold level, the power class switcher 116 may send power class change indicators that cause the UE 102 to change its power class less frequently to assist with preserving the battery life of the UE 102.

Although the power class switcher 116 can dynamically determine whether the UE 102 should change power classes as discussed above, in some examples the UE 102 can be configured to limit which the set of power classes the power class switcher 116 can select from. For example, the UE 102 may support Power Class 1.5 and Power Class 2. However, if the battery 108 of the UE 102 has a charge level under a defined threshold when the UE 102 first registers with a base station, the UE 102 may provide UE capability data 120 during network registration indicating that the UE 102 only supports Power Class 2. By suppressing information in the UE capability data 120 indicating that the UE 102 also supports Power Class 1.5, the UE 102 can prevent the power class switcher 116 from considering Power Class 1.5 as an option for the UE 102. Accordingly, in this situation the UE 102 may operate based on Power Class 2 while connected to the base station due to the low charge level of the battery 108, without the power class switcher 116 potentially instructing the UE 102 to change to using Power Class 1.5 and thus potentially causing the UE to consumer power at higher power consumption levels. Similarly, if the UE 102 is in an idle state and is not actively sending or receiving data, the UE 102 may also suppress information in the UE capability data 120 indicating that the UE 102 also supports Power Class 1.5 in addition to Power Class 2, such that the UE 102 can use Power Class 2 while idle. However, if the UE 102 moves from the idle state to an active state, the UE 102 may provide new UE capability data 120 indicating that the UE 102 does support both Power Class 1.5 and Power Class 2, such that the power class switcher 116 can dynamically instruct the UE 102 which of those power classes to use while the UE 102 is in the active state.

Figure 4:
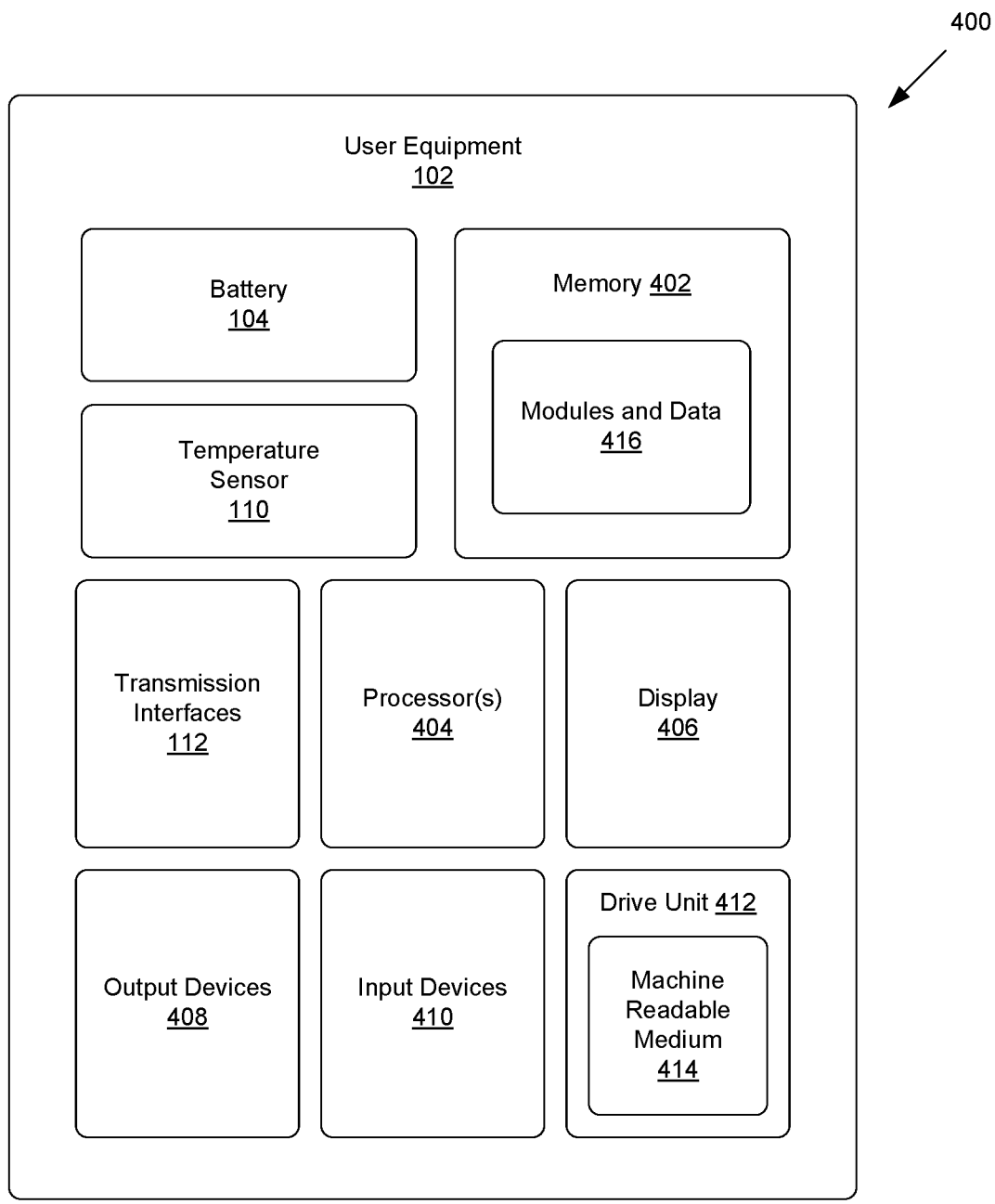
FIG. 4 shows an example of system architecture for the UE.

FIG. 4 shows an example 400 of system architecture for the UE 102, in accordance with various examples. The UE 102 can include the battery 108, the temperature sensor 110, and the transmission interfaces 112 discussed above. The UE 102 can also have at least one memory 402, processor(s) 404, a display 406, output devices 408, input devices 410, and/or a drive unit 412 including a machine readable medium 414.

As discussed above, the battery 108 can be a Li-ion battery, a LiPo battery, a NiCd battery, a NiMH battery, or other type of battery. The temperature sensor 110 can be a thermocouple, thermistor, RTD, semiconductor-based integrated circuit, thermometer, and/or any other type of temperature sensor.

The transmission interfaces 112 can include transceivers, modems, interfaces, antennas, and/or other components that perform or assist in exchanging radio frequency (RF) communications with base stations of the RAN 104, a Wi-Fi access point, or otherwise implement connections with one or more networks. The transmission interfaces 112 can be compatible with one or more radio access technologies, such as 5G NR radio access technologies and/or LTE radio access technologies.

The transmission interfaces 112 can also be configured to transmit data according to a selected power class, as described herein. In some examples, the transmission interfaces 112 can be configured to interpret a power class change indicator in a radio frame at a physical layer, and use a power class indicated by the power class change indicator, as described above with respect to FIG. 2. In other examples, elements of the UE 102 above the physical layer can interpret a power class change indicator received in another type of message, such as an RRC reconfiguration message, and can instruct the transmission interfaces 112 to use the power class indicated by the power class change indicator.

In various examples, the memory 402 can include system memory, which may be volatile (such as RAM), non-volatile (such as ROM, flash memory, etc.) or some combination of the two. The memory 402 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the UE 102. Any such non-transitory computer-readable media may be part of the UE 102.

The memory 402 can include one or more software or firmware elements, such as computer-readable instructions that are executable by the one or more processors 404. For example, the memory 402 can store computer-executable instructions that cause the UE 102 to transmit UE capability data 120 to the RAN 104, transmit the UE report 122 to the RAN 104, and/or interpret and implement the power class change indicator 118. The memory 402 can also store other modules and data 416, which can be utilized by the UE 102 to perform or enable performing any action taken by the UE 102. The other modules and data 416 can include a UE platform, operating system, and applications, and data utilized by the platform, operating system, and applications.

In various examples, the processor(s) 404 can be a CPU, a graphics processing unit (GPU), or both CPU and GPU, or any other type of processing unit. Each of the one or more processor(s) 404 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 404 may also be responsible for executing all computer applications stored in the memory 402, which can be associated with common types of volatile (RAM) and/or nonvolatile (ROM) memory.

The display 406 can be a liquid crystal display or any other type of display commonly used in UEs. For example, the display 406 may be a touch-sensitive display screen, and can thus also act as an input device or keypad, such as for providing a soft-key keyboard, navigation buttons, or any other type of input.

The output devices 408 can include any sort of output devices known in the art, such as the display 406, speakers, a vibrating mechanism, and/or a tactile feedback mechanism. Output devices 408 can also include ports for one or more peripheral devices, such as headphones, peripheral speakers, and/or a peripheral display.

The input devices 410 can include any sort of input devices known in the art. For example, input devices 410 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 414 can store one or more sets of instructions, such as software or firmware, that embodies any one or more of the methodologies or functions described herein. The instructions can also reside, completely or at least partially, within the memory 402, processor(s) 404, and/or transmission interface(s) 112 during execution thereof by the UE 102. The memory 402 and the processor(s) 404 also can constitute machine readable media 414.

Figure 5:
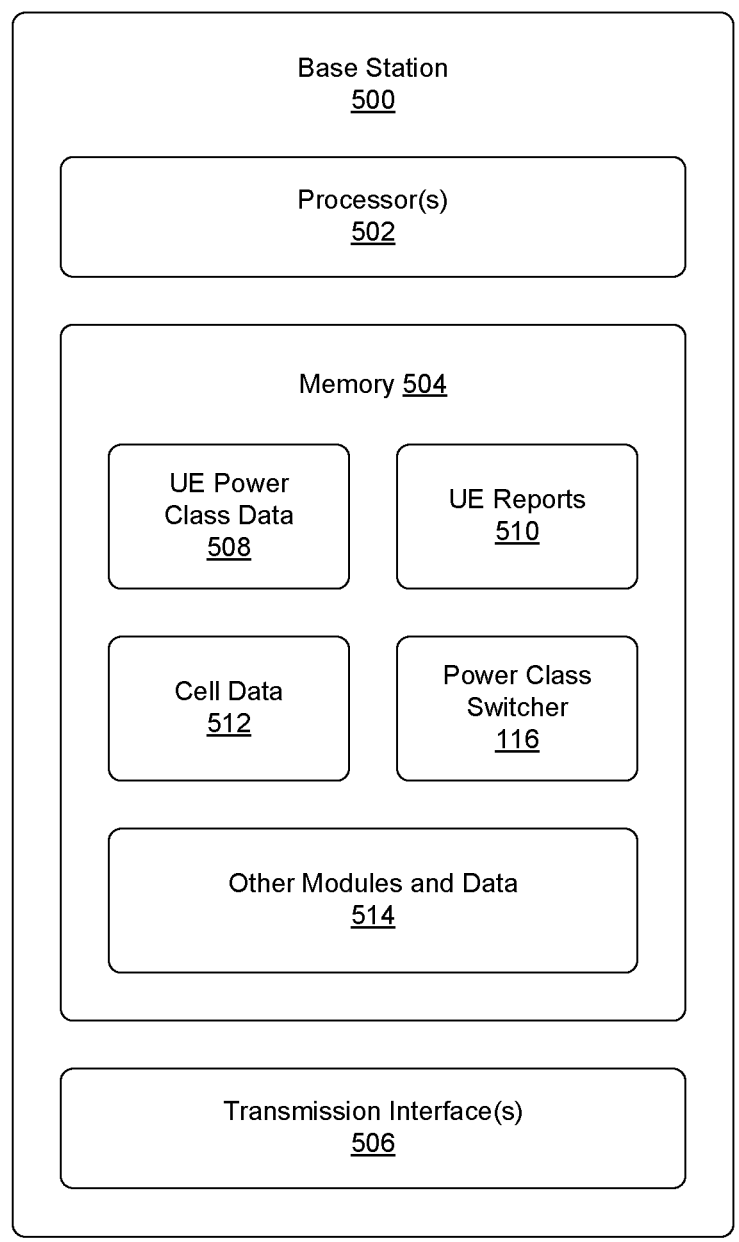
FIG. 5 shows an example system architecture for a base station.

FIG. 5 shows an example system architecture for a base station 500, in accordance with various examples. In some examples, the base station 500 may be a gNB, eNB, or other base station or network element in the RAN 104. As shown, the base station 500 can include processor(s) 502, memory 504, and transmission interfaces 506.

The processor(s) 502 may be a CPU or any other type of processing unit. Each of the one or more processor(s) 502 may have numerous ALUs that perform arithmetic and logical operations, as well as one or more CUs that extract instructions and stored content from processor cache memory, and then executes these instructions by calling on the ALUs, as necessary, during program execution. The processor(s) 502 may also be responsible for executing all computer-executable instructions and/or computer applications stored in the memory 504.

In various examples, the memory 504 can include system memory, which may be volatile (such as RAM), non-volatile (such as ROM, flash memory, etc.) or some combination of the two. The memory 504 can also include additional data storage devices (removable and/or non-removable) such as, for example, magnetic disks, optical disks, or tape. Memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, DVD, or other optical storage, magnetic cassettes, magnetic tape, magnetic disk storage or other magnetic storage devices, or any other non-transitory medium which can be used to store the desired information and which can be accessed by the base station 500. Any such non-transitory computer-readable media may be part of the base station 500.

The memory 504 can store computer-readable instructions and/or other data associated with operations of the base station 500. For example, the memory 504 can store UE power class data 508, UE reports 510, cell data 512, and the power class switcher 116.

The UE power class data 508 can indicate a set of power classes that each UE registered with the base station 500 supports, based on UE capability data reported by the UEs during network registration or at other times. For example, the UE power class data 508 may indicate that a first UE supports Power Class 1.5 and Power Class 2, such that the power class switcher 116 can dynamically instruct the first UE to switch between using Power Class 1.5 and Power Class 2. However, the UE power class data 508 may indicate that a second UE only supports Power Class 2, such that the power class switcher 116 is not configured to dynamically change the power class of the second UE. The UE power class data 508 may also indicate that a third UE supports Power Class 2 and Power Class 3, such that the power class switcher 116 can dynamically instruct the first UE to switch between using Power Class 2 and Power Class 3.

The UE power class data 508 can also indicate a current power class for each UE. For example, based on the UE capability data 120 indicating that the UE 102 supports Power Class 2 and Power Class 1.5, and SIB1 information broadcast indicating that the base station 500 permits UEs to use Power Class 1.5, the base station 500 can infer that the UE 102 will initially use Power Class 1.5 upon registration with the base station 500. The base station 500 can indicate, in a database, table, or other type of UE power class data 508, that the UE 102 is currently using Power Class 1.5. Thereafter, if the power class switcher 116 instructs the UE 102 to use Power Class 2, the base station 500 can update the UE power class data 508 to indicate that the UE 102 is now using Power Class 2. Accordingly, the base station 500 can update the UE power class data 508 to reflect the UE's current power classes based on initial power classes used by UEs, and/or later power class change indicators sent by the base station 500 to the UEs over time.

The UE reports 510 can include data from one or more UE reports, such as UE report 122, collected from one or more UEs over time. For example, the UE 102 may periodically send new UE reports to the base station 500 over time. Different UEs may also send in different UE reports. The base station 500 can store some or all of the received UE reports in the memory 504 for use by the power class switcher 116.

The cell data 512 can include metrics or other KPIs that are measured or derived for a cell associated with the base station 500. For example, the cell data 512 can include an aggregated interference level associated with the cell, based on individual SINR measurements included in UE reports 510 provided by a set of UEs registered with the base station 500. In some examples, the cell data 512 may also include an indication of how many UEs are currently registered with the base station 500. The power class switcher 116 may consider the cell data 512 in addition to, or instead of, one or more of the UE reports 510 and/or the UE power class data 508 to determine whether to change the power class used by any of the registered UEs.

The memory 504 can further store other modules and data 516, which can be utilized by the base station 500 to perform or enable performing any action taken by the base station 500. The modules and data 516 can include a platform, operating system, firmware, and/or applications, and data utilized by the platform, operating system, firmware, and/or applications.

The transmission interfaces 506 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with one or more UEs, other base stations or elements of the RAN 104, elements of the core network 106, and/or other network elements, and can transmit data over such connections. For example, the transmission interfaces 506 can establish one or more connections with the UE 102 over air interfaces. The transmission interfaces 506 can also support transmissions using one or more radio access technologies, such as 5G NR or LTE.

Figure 6:
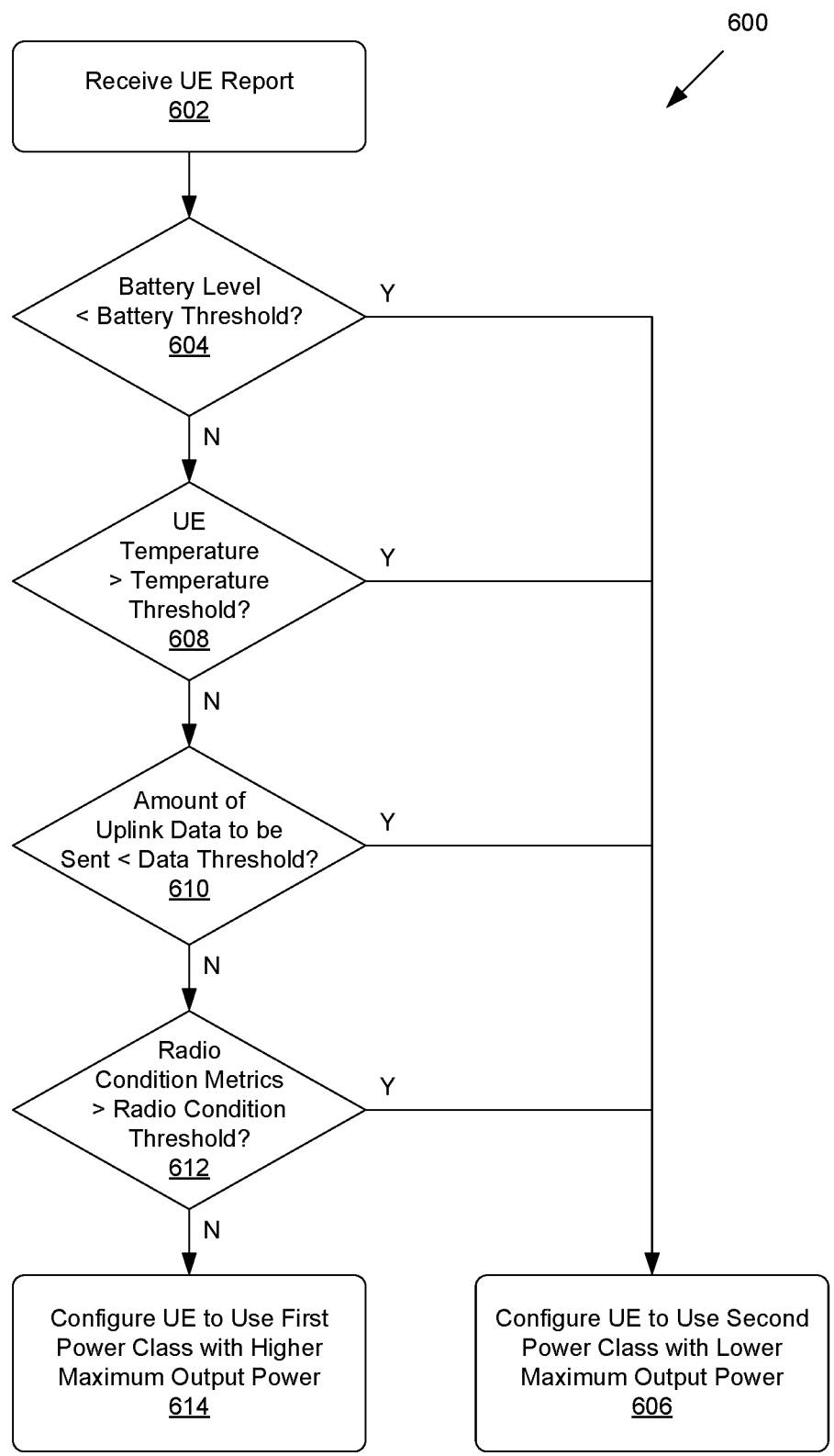
FIG. 6 shows a flowchart of an example method by which a power class switcher can dynamically determine a power class for the UE.

FIG. 6 shows a flowchart of an example method 600 by which the power class switcher 116 can dynamically determine a power class for the UE 102. As discussed above, the power class switcher 116 may be an element of a base station, or other network element of the RAN 104. The power class switcher 116 may have information that indicates a set of power classes 114 supported by the UE 102, for instance based on UE capability data 120 reported by the UE 102 during network registration. The set of power classes 114 can include a first power class with a higher maximum output power, and a second power class with a lower maximum output power. For example, the first power class can be Power Class 1.5, while the second power class can be Power Class 2. The power class switcher 116 may also have information indicating which one of the supported power classes is currently in use by the UE 102, for instance based on an inference of an initial power class selected by the UE 102 during a network registration procedure or based on a previous power class change indicator provided by the power class switcher 116 to the UE 102.

At block 602, the power class switcher 116 can receive the UE report 122 from the UE 102. The UE report 122 can include power data 302, temperature data 304, radio condition data 306, uplink transmission data 308, and/or other types of information, as discussed above with respect to FIG. 3.

At block 604, the power class switcher 116 can determine whether a current charge level of the battery 108 is less than a predefined battery threshold. The battery threshold may be set at a battery charge level of 20%, 30%, 40%, 50%, or any other level. For example, the power class switcher 116 can determine if power data 302 provided by the UE 102 in the UE report 122 indicates that the charge level of the battery 108 is less than the predefined battery threshold.

If the power class switcher 116 determines that the current charge level of the battery 108 is less than the predefined battery threshold (Block 604—Yes), the power class switcher 116 can determine that the UE 102 should be using the second power class. Because the second power class has a lower maximum output power than the first power class, and the current charge level of the battery 108 is less than the predefined battery threshold, use of the second power class may assist with preserving battery life of the battery 108. Accordingly, at block 606, the power class switcher 116 can configure the UE 102 to use the second power class, by sending the power class change indicator 118 to the UE 102 with a value indicating that the UE 102 should use the second power class. In some examples, if the UE 102 is already using the second power class, the value of the power class change indicator 118 may indicate that the UE 102 should continue to use the second power class. However, if the UE 102 is currently using the first power class, the value of the power class change indicator 118 may indicate that the UE 102 should switch from using the first power class to using the second power class.

If the power class switcher 116 determines that the current charge level of the battery 108 is at or above the predefined battery threshold (Block 604—No), the power class switcher 116 can, at block 608, determine whether a temperature of the UE 102 is above a predefined temperature threshold. The temperature threshold may be set at 30° C., 32° C., 35° C., or any other temperature. For example, the power class switcher 116 can determine if temperature data 304 provided by the UE 102 in the UE report 122, or an estimated temperature of the UE 102 inferred from power consumption rates and/or other metrics, indicates that a temperature of the UE 102 is above the predefined temperature threshold.

If the power class switcher 116 determines that the temperature of the UE 102 is above the predefined temperature threshold (Block 608—Yes), the power class switcher 116 can determine that the UE 102 should be using the second power class. Because the second power class has a lower maximum output power than the first power class, use of the second power class may result in the temperature of the UE 102 being cooler than if the UE 102 uses the higher maximum output power allowed by the first power class. Accordingly, the power class switcher 116 can configure the UE 102 to use the second power class at block 606, by sending the power class change indicator 118 to the UE 102 with a value indicating that the UE 102 should use the second power class. In some examples, if the UE 102 is already using the second power class, the value of the power class change indicator 118 may indicate that the UE 102 should continue to use the second power class. However, if the UE 102 is currently using the first power class, the value of the power class change indicator 118 may indicate that the UE 102 should switch from using the first power class to using the second power class.

If the power class switcher 116 determines that the temperature of the UE 102 is at or below the predefined temperature threshold (Block 608—No), the power class switcher 116 can, at block 610, determine whether an amount of uplink data to be sent by the UE 102 is less than a predefined data threshold. In some examples, the predefined data threshold can be an amount of data, such as 1 MB, 5 MB, or any other amount of data. In other examples, the predefined data threshold can be an uplink buffer fullness level, such as 75%, 90%, or any other buffer fullness level. For example, the power class switcher 116 can determine if a buffer fullness level provided by the UE 102 in uplink transmission data 308 of the UE report 122 indicates that an uplink buffer of the UE is filled to above the predefined data threshold.

If the power class switcher 116 determines that the amount of uplink data to be sent by the UE 102 is less than the predefined data threshold (Block 608—Yes), the power class switcher 116 can determine that the UE 102 should be using the second power class. In this situation, the UE 102 may be sending relatively small amounts of data, or may have a relatively low uplink buffer fullness level. As such, the UE 102 may not appreciably benefit from using the higher maximum output power allowed by the first power class relative to the second power class. Accordingly, the power class switcher 116 can configure the UE 102 to use the second power class at block 606, by sending the power class change indicator 118 to the UE 102 with a value indicating that the UE 102 should use the second power class. In some examples, if the UE 102 is already using the second power class, the value of the power class change indicator 118 may indicate that the UE 102 should continue to use the second power class. However, if the UE 102 is currently using the first power class, the value of the power class change indicator 118 may indicate that the UE 102 should switch from using the first power class to using the second power class.

If the power class switcher 116 determines that the amount of uplink data to be sent by the UE 102 at or above the predefined data threshold (Block 610—No), the power class switcher 116 can, at block 612, determine whether one or more radio condition metrics associated with the UE 102 exceed a predefined radio condition threshold. For example, the power class switcher 116 can determine if a SINR value provided by the UE 102 in radio condition data 306 of the UE report 122 is above or below a predefined threshold SINR value.

If the power class switcher 116 determines that radio condition metrics associated with the UE 102 exceed a predefined radio condition threshold (Block 608—Yes), the power class switcher 116 can determine that the UE 102 should be using the second power class. For example, a SINR value provided by the UE 102 may indicate that the UE is experiencing relatively low interference, and/or that the UE 102 may be located outside or at a position that is relatively close to the base station, such that transmitting uplink signals at up to the lower maximum output power permitted by the second power class may sufficiently allow the uplink signals to reach the base station. As such, the UE 102 may not appreciably benefit from using the higher maximum output power allowed by the first power class relative to the second power class. Accordingly, the power class switcher 116 can configure the UE 102 to use the second power class at block 606, by sending the power class change indicator 118 to the UE 102 with a value indicating that the UE 102 should use the second power class. In some examples, if the UE 102 is already using the second power class, the value of the power class change indicator 118 may indicate that the UE 102 should continue to use the second power class. However, if the UE 102 is currently using the first power class, the value of the power class change indicator 118 may indicate that the UE 102 should switch from using the first power class to using the second power class.

If the power class switcher 116 determines that radio condition metrics associated with the UE 102 are at or below the predefined radio condition threshold (Block 612—No), the power class switcher 116 can, at block 614, determine that the UE 102 should be using the first power class. For example, a SINR value provided by the UE 102 may indicate that the UE is experiencing relatively high interference, and/or that the UE 102 may be located inside or at a position that is relatively far away from the base station, such that transmitting uplink signals at up to the higher maximum output power permitted by the first power class may be more likely to allow the uplink signals to reach the base station. Accordingly, the power class switcher 116 can configure the UE 102 to use the first power class at block 614, by sending the power class change indicator 118 to the UE 102 with a value indicating that the UE 102 should use the first power class. In some examples, if the UE 102 is already using the first power class, the value of the power class change indicator 118 may indicate that the UE 102 should continue to use the first power class. However, if the UE 102 is currently using the second power class, the value of the power class change indicator 118 may indicate that the UE 102 should switch from using the second power class to using the first power class.

The order of operations shown in FIG. 6 is not intended to be limiting, as in other examples the power class switcher 116 may be configured to evaluate the factors shown in FIG. 6 in an order different from the order shown in FIG. 6. For example, the power class switcher 116 may consider an amount of uplink data to be sent at block 610 and/or radio condition metrics at block 612 before considering a battery level of the UE 102 at block 604 and/or a temperature of the UE 102 at block 608.

In still other examples, the power class switcher 116 may be configured to evaluate any or all of the factors shown in FIG. 6, and/or other factors, and assign weights to each factor. The power class switcher 116 may accordingly use a weighted combination of the factors to determine whether to configure the UE 102 to use the second power class at block 606 or to configure the UE 102 to use the first power class at block 608. For instance, if the battery 108 is at charge level of 50% and the UE 102 is experiencing relatively poor radio conditions, the power class switcher 116 may weigh the charge level of the battery 108 less than the poor radio conditions, and determine that the UE 102 should use the first power class in an attempt to counteract the poor radio conditions. However, if the battery 108 is at charge level of 15% and the UE 102 is experiencing similar relatively poor radio conditions, the power class switcher 116 may weigh the charge level of the battery 108 more heavily, and determine that the UE 102 should use the second power class in an attempt to extend the battery life of the UE 102 despite the relatively poor radio conditions.

As shown in FIG. 6, although the UE 102 may support both the first power class and the second power class, the power class switcher 116 may tend to configure the UE 102 to use the second power class in situations in which the charge level of the battery 108 is low, the temperature of the UE 102 is high, the UE 102 is sending relatively little uplink data, and/or the UE 102 is experiencing relatively good radio conditions. In these situations, the extra uplink output power that the first power class may provide over the second power class may be unlikely to result in appreciable benefits to the UE 102, or to a user of the UE 102, and may instead result in increased power consumption, faster draining of the battery 108, increased heat generation, and/or other appreciable drawbacks.

However, in other situations in which the charge level of the battery 108 is high, the temperature of the UE 102 is low, the UE 102 is sending a large amount of uplink data, and/or the UE 102 is experiencing relatively poor radio conditions, the power class switcher 116 may tend to configure the UE 102 to use the first power class. In these situations, the extra uplink output power that the first power class may provide over the second power class may be more likely to result in appreciable benefits to the UE 102, or to a user of the UE 102, such as improved signal strengths, improved signal propagation ranges, improved reliability, higher data transfer speeds, and/or other benefits. In these situations, users may be less likely to perceive increased power consumption, faster draining of the battery 108, increased heat generation, and/or other appreciable impacts associated with using the first power class when the charge level of the battery 108 is high and/or the temperature of the UE 102 is low. Even if such impacts are noticed by users, users may consider such impacts to be an acceptable tradeoff to the improved reliability, higher data transfer speeds, or other benefits of the first power class when the charge level of the battery 108 is high and/or the temperature of the UE 102 is low.

Figure 7:
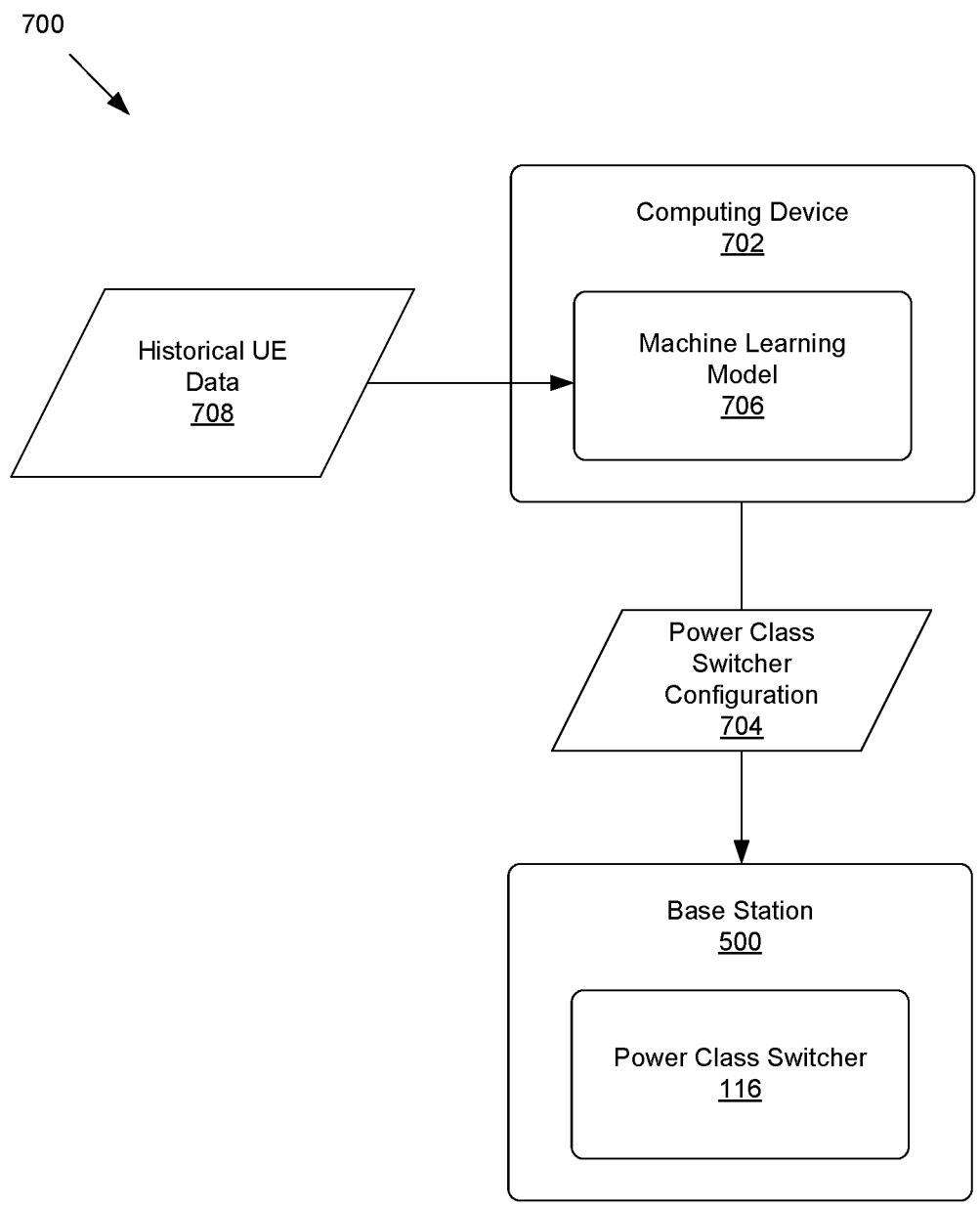
FIG. 7 shows an example of a computing device that is configured to generate and provide a power class switcher configuration to the power class switcher.

FIG. 7 shows an example 700 of a computing device 702 that is configured to generate and provide a power class switcher configuration 704 to the power class switcher 116. The power class switcher configuration 704 may be a configuration file that can be used by the power class switcher 116, an update to the power class switcher 116, a new version of the power class switcher 116, or any other type of data that can adjust the operations of the power class switcher 116. For example, the power class switcher configuration 704 may adjust which factors are considered by the power class switcher 116, add or delete factors to be considered by the power class switcher 116, adjust a relative order of when the power class switcher 116 considers different factors, define weights associated with different factors overall and/or in different situations, adjusts one or more threshold levels used to evaluate different factors, and/or adjusts any other operation or data used by the power class switcher 116.

The computing device 702 can be a computer, server, or other computing device that can execute computer-readable instructions to send the power class switcher configuration 704 to the power class switcher 116 at the base station 500 via a network, such as the telecommunication network. For example, the computing device 702 can have processors, data interfaces, memory, machine readable media, and/or other computer architecture elements similar to the elements of the UE 102 shown in FIG. 4 or the base station 500 shown in FIG. 5. In some examples, the computing device 702 may be operated by an operator of the telecommunication network, such that the operator can provide the power class switcher configuration 704 to adjust how the power class switcher 116 dynamically determines which power class the UE 102 should use. For example, the computing device 702 may be part of the core network 106, the RAN 104, or any other element of the telecommunication network.

In some examples, the computing device 702 can include, or be associated with, a machine learning model 706 that can be trained to generate the power class switcher configuration 704. The machine learning model 706 can be based on support-vector networks, linear regression, logistic regression, nearest-neighbor algorithms, decision trees, recurrent neural networks or other types of neural networks, and/or other machine learning and/or artificial intelligence techniques.

In some examples, the machine learning model 706 can be trained using supervised or unsupervised machine learning based on historical UE data 708. The historical UE data 708 may include copies of UE reports 510 previously received from a set of UEs. The historical UE data 708 may include power data 302, temperature data 304, radio condition data 306, and/or uplink transmission data 308 associated with the set of UEs, along with data indicating which power classes the UEs were using at times that the power data 302, temperature data 304, radio condition data 306, and/or uplink transmission data 308 were reported. The machine learning model 706 can evaluate such factors in the historical UE data 708, and determine which factors should be considered by the power class switcher 116 in which situations, determine weights to assign to those factors in those situations, determine an order in which the power class switcher 116 should evaluate the factors, and/or otherwise determine how the power class switcher 116 should evaluate factors. The machine learning model 706 can accordingly generate the power class switcher configuration 704 to indicate the identified factors, weights for the factors, values for thresholds, and/or other adjustments to how the power class switcher 116 operates.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
determining that a user equipment (UE) supports a first power class and a second power class, wherein the first power class permits the UE to perform uplink transmissions at a higher output power level than the second power class;
determining weights corresponding with one or more UE metrics;
determining a weighted combination of the one or more UE metrics based on the weights; and
determining to change the UE from using the first power class to using the second power class based at least in part on the weighted combination.

2. The method of claim 1, further comprising instructing the UE to use the second power class by including a power class change indicator associated with an identifier of the UE in a radio frame transmitted by an access point.

3. The method of claim 2, wherein the power class change indicator is a bit included in Physical Downlink Control Channel (PDCCH) information of the radio frame.

4. The method of claim 2, wherein instructing the UE to use the second power class comprises transmitting a radio resource control (RRC) reconfiguration message that instructs the UE to use the second power class.

5. The method of claim 1, further comprising:
determining that a UE battery level measurement included in the one or more UE metrics is below a battery threshold,
wherein determining to change the UE from using the first power class to using the second power class based at least in part on determining that the UE battery level measurement is below the battery threshold.

6. The method of claim 1, further comprising:
determining that a UE temperature measurement included in the one or more UE metrics exceeds a temperature threshold,
wherein determining to \change the UE from using the first power class to using the second power class based at least in part on determining that the UE temperature measurement exceeds the temperature threshold.

7. The method of claim 1, wherein the one or more UE metrics includes one or more of: a signal-to-interference-plus-noise ratio (SINR), a throughput measurement, or an uplink buffer fullness level.

8. The method of claim 1, further comprising receiving a UE report indicating the one or more UE metrics.

9. The method of claim 1, wherein:
the one or more UE metrics includes one or more of: UE battery level measurement, a UE power consumption rate, a UE temperature measurement, a signal-to-interference-plus-noise ratio (SINR), a throughput measurement, or an uplink buffer fullness level, and
the weights are determined based on a machine learning model trained on historical data indicating correlations between the one or more UE metrics.

10. The method of claim 1, wherein determining to change the UE from using the first power class to using the second power class, based further on amounts of other UEs connected to an access point that are using the first power class and the second power class.

11. A computing device, comprising:
one or more processors;
memory storing computer-executable instructions that, when executed by the one or more processors, cause the one or more processors to perform operations comprising:
determining that a user equipment (UE) supports a first power class and a second power class, wherein the first power class permits the UE to perform uplink transmissions at a higher output power level than the second power class;
determining weights corresponding with one or more UE metrics;
determining a weighted combination of the one or more UE metrics based on the weights; and
determining to change the UE from using the first power class to using the second power class based at least in part on the weighted combination.

12. The computing device of claim 11, the operations further comprising instructing the UE to use the second power class by including a power class change indicator associated with an identifier of the UE in a radio frame transmitted by an access point.

13. The computing device of claim 12, wherein the power class change indicator is a bit included in Physical Downlink Control Channel (PDCCH) information of the radio frame.

14. The computing device of claim 12, wherein instructing the UE to use the second power class comprises transmitting a radio resource control (RRC) reconfiguration message that instructs the UE to use the second power class.

15. The computing device of claim 11, wherein the one or more UE metrics include at least a UE battery level measurement and a UE temperature measurement.

16. One or more non-transitory computer-readable media storing computer-executable instructions that, when executed by one or more processors of a radio access network element, cause the one or more processors to perform operations comprising:
determining that a user equipment (UE) supports a first power class and a second power class, wherein the first power class permits the UE to perform uplink transmissions at a higher output power level than the second power class;
determining weights corresponding with one or more UE metrics;
determining a weighted combination of the one or more UE metrics based on the weights; and
determining to change the UE from using the first power class to using the second power class based at least in part on the weighted combination.

17. The one or more non-transitory computer-readable media of claim 16, the operations further comprising instructing the UE to use the second power class by including a power class change indicator associated with an identifier of the UE in a radio frame transmitted by the radio access network element.

18. The one or more non-transitory computer-readable media of claim 17, wherein the power class change indicator is a bit included in Physical Downlink Control Channel (PDCCH) information of the radio frame.

19. The one or more non-transitory computer-readable media of claim 17, wherein instructing the UE to use the second power class comprises transmitting a radio resource control (RRC) reconfiguration message that instructs the UE to use the second power class.

20. The one or more non-transitory computer-readable media of claim 16, wherein the one or more UE metrics include at least a UE battery level measurement and a UE temperature measurement.

* * * * *